(12) United States Patent
Owan et al.

(10) Patent No.: US 12,487,587 B1
(45) Date of Patent: Dec. 2, 2025

(54) VISUAL PERCEPTION AND TECHNIQUES FOR PLACING INVENTORY INTO PODS WITH A ROBOTIC WORKCELL

(71) Applicant: Amazon Technologies, Inc., Seattle, WA (US)

(72) Inventors: Parker Owan, Lake Stevens, WA (US); Sisir Babu Karumanchi, Seattle, WA (US); Kristina Lisa Klinkner, Vashon, WA (US); Xin Wang, Issaquah, WA (US); Baoyuan Liu, Bellevue, WA (US); Joshua Rosenberg Hooks, Seattle, WA (US); Rahul Balakrishna Warrier, Kirkland, WA (US); Andres Camilo Cortes, Seattle, WA (US); Siyu Dai, Seattle, WA (US); Aaron Joseph Parness, Mercer Island, WA (US); James Schmidt, Seattle, WA (US); Andrew Stubbs, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 908 days.

(21) Appl. No.: 17/707,579

(22) Filed: Mar. 29, 2022

(51) Int. Cl.
*G05B 19/418* (2006.01)
*B25J 9/16* (2006.01)
(Continued)

(52) U.S. Cl.
CPC ...... *G05B 19/41815* (2013.01); *B25J 9/1615* (2013.01); *B25J 9/1669* (2013.01); *B25J 9/1682* (2013.01); *B25J 19/023* (2013.01);
*G06Q 10/087* (2013.01); *G06T 7/10* (2017.01); *G06V 10/70* (2022.01); *G05B 2219/34348* (2013.01);
(Continued)

(58) Field of Classification Search
CPC . G05B 19/41815; B25J 9/1615; B25J 9/1669; B25J 9/1682; B25J 19/023; B25J 9/021; G06Q 10/087; G06T 7/10
See application file for complete search history.

(56) References Cited

U.S. PATENT DOCUMENTS 9,688,472 B1 * 6/2017 Stubbs ................. B65G 1/1373
10,207,868 B1 * 2/2019 Stubbs ................. G06Q 10/087
(Continued)

FOREIGN PATENT DOCUMENTS

WO    WO-2016130849 A1 * 8/2016 ........... G05B 19/418

*Primary Examiner* — Patrick H Mackey
(74) *Attorney, Agent, or Firm* — Eversheds Sutherland (US) LLP

(57) ABSTRACT

Techniques and systems for performing a perception analysis for a robotic stowing operation are described. An example technique includes obtaining, via multiple sensors, multiple first images, wherein each first image is an image of a different container of an inventory holder within a robotic workcell. A first machine learning (ML) and image processing pipeline is performed with the first images to determine displacement locations for the containers of the inventory holder. A second ML and image processing pipeline is performed with the first images to determine content signatures for the containers. A plan is generated for stowing a first item into a first container, based at least in part on the plurality of content signatures and the plurality of displacement locations. A robotic apparatus is controlled to stow the first item into the first container, based on the plan.

20 Claims, 20 Drawing Sheets

(51) Int. Cl.
*B25J 19/02* (2006.01)
*G06Q 10/087* (2023.01)
*G06T 7/10* (2017.01)
*G06V 10/70* (2022.01)

(52) U.S. Cl.
CPC .............. *G05B 2219/39484* (2013.01); *G05B 2219/40629* (2013.01); *G06T 2207/20081* (2013.01); *G06T 2207/20112* (2013.01); *G06T 2207/30252* (2013.01)

(56) References Cited

U.S. PATENT DOCUMENTS

| | | | |
|---|---|---|---|
| 10,380,542 B2* | 8/2019 | Hammelbacher | A01K 1/031 |
| 10,399,778 B1* | 9/2019 | Shekhawat | B65G 1/1373 |
| 10,752,442 B2* | 8/2020 | Shekhawat | B25J 9/1664 |
| 10,759,054 B1* | 9/2020 | Patil | B25J 9/1682 |
| 11,046,518 B2* | 6/2021 | Arase | B25J 19/021 |
| 11,794,349 B2* | 10/2023 | Kalouche | B25J 9/1697 |
| 12,013,686 B1* | 6/2024 | Parness | B25J 9/1615 |
| 2015/0032252 A1* | 1/2015 | Galluzzo | B25J 9/162 |
| | | | 700/218 |
| 2020/0130936 A1* | 4/2020 | Shekhawat | B25J 9/1664 |

* cited by examiner

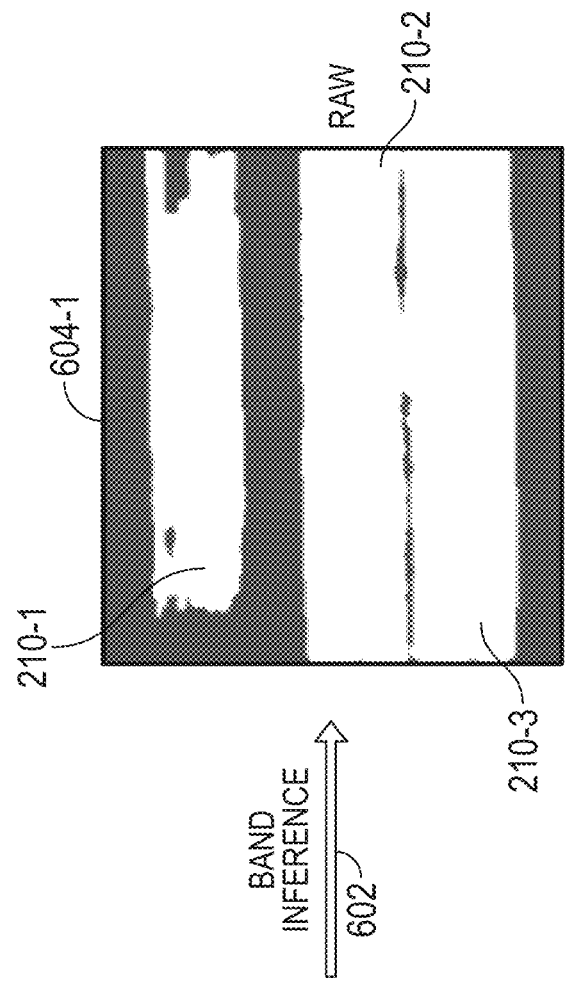
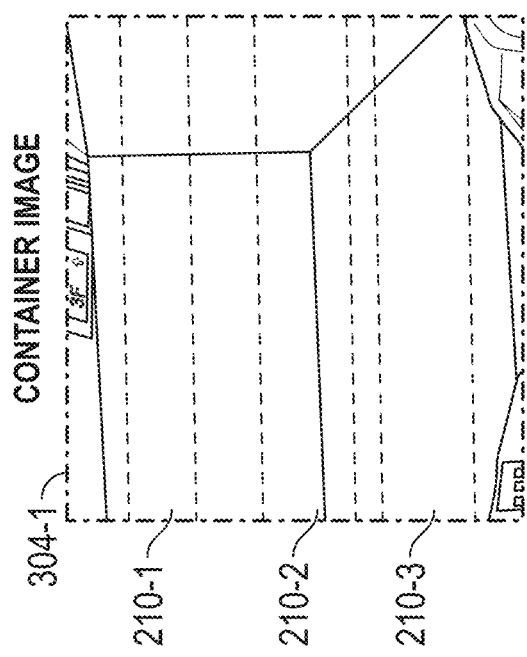
FIG. 7A

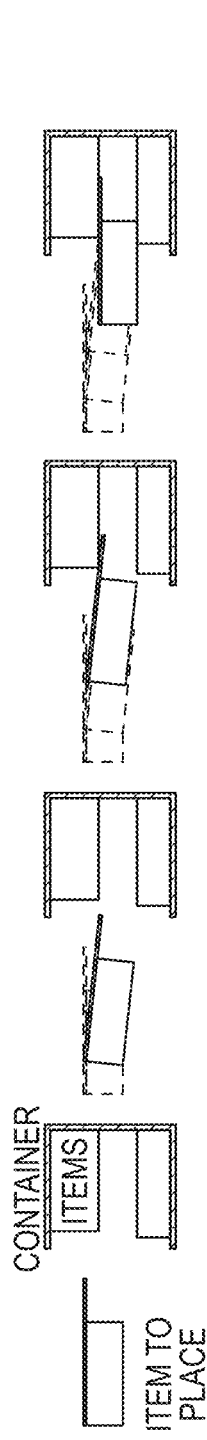
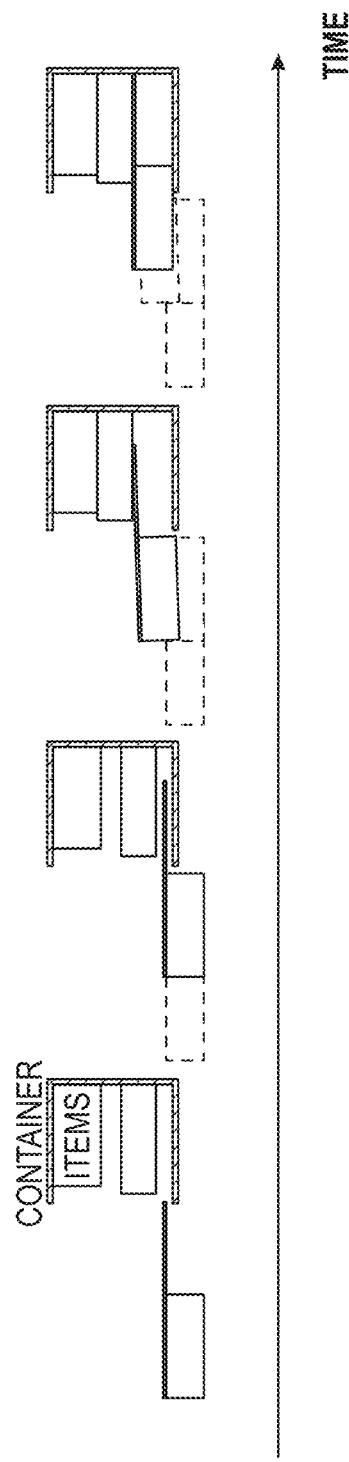

VISUAL PERCEPTION AND TECHNIQUES FOR PLACING INVENTORY INTO PODS WITH A ROBOTIC WORKCELL

BACKGROUND

The present disclosure relates to techniques for controlling a robotic system to stow items into a goods-to-person system, such as containers on a rack.

Many facilities (e.g., warehouses, plants, distribution centers, storehouses, factories, etc.) perform tasks such as stowing items, picking items, shipping items, and the like. Such facilities generally use various transport devices (e.g., carts, containers, pallets, bins, etc.) to transport items to different locations inside and/or outside the facility. As an example, an item may be retrieved from storage and transported to a location in preparation for stowing in a container. In another example, an item can be retrieved (or picked) from a container in preparation for shipping.

Items in a facility are typically stowed in containers and then retrieved at a later time to fulfill a customer's order. Items may be stowed randomly, such that the containers may contain many different types of items that have many different sizes. Further, the items may be arranged differently in each container. Because of the wide variety of items being stowed and retrieved, it is difficult to control a robotic system that can reliably stow an item into a container that may already have many different types of items.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIGS. 7A-7B depict a sequence of operations for a retaining element perception component, according to one embodiment.

FIGS. 11A-11B depict example motions for placement strategies, according to one embodiment.

DETAILED DESCRIPTION

Figure 1:
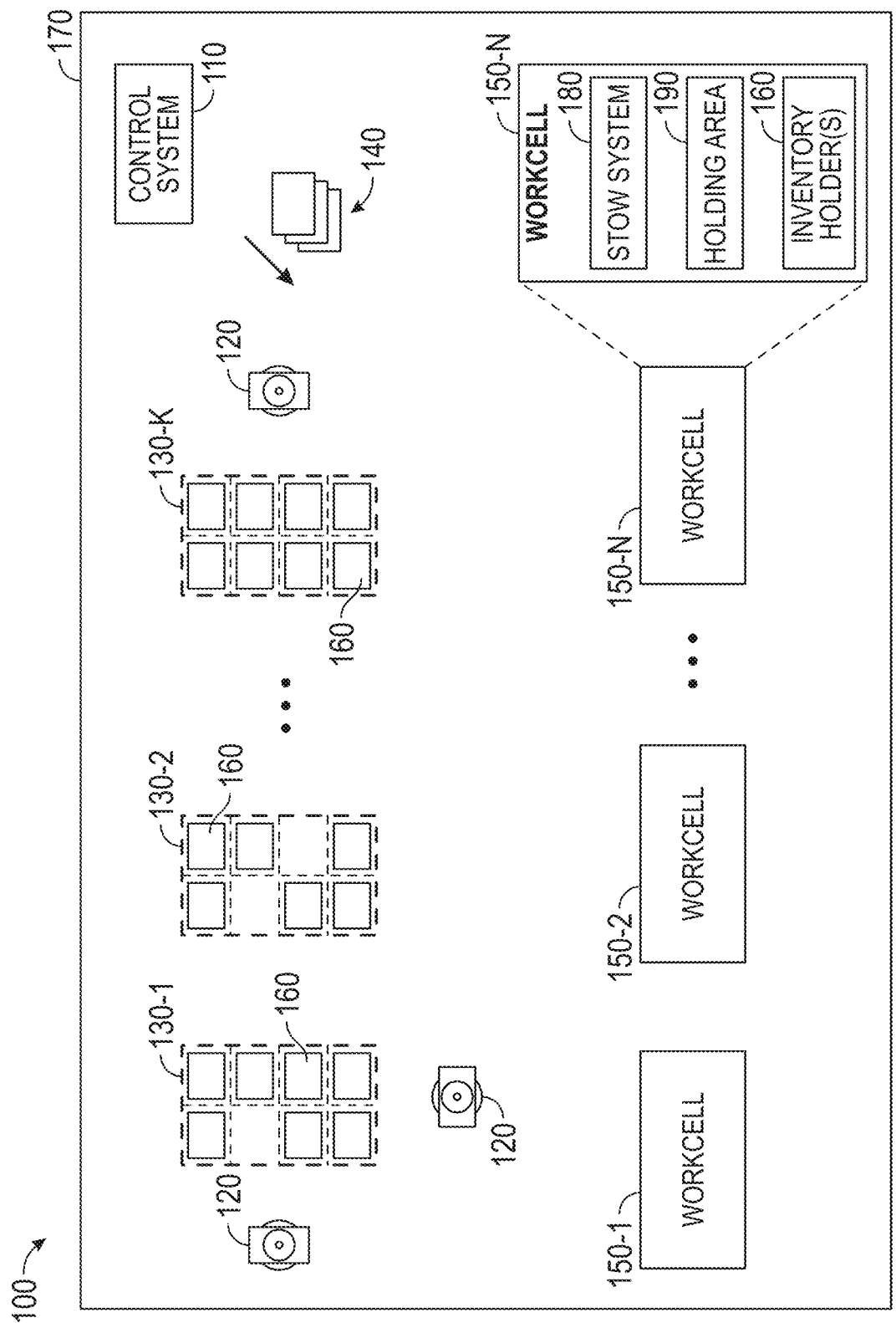
FIG. 1 is a block diagram of an example inventory system, according to one embodiment.

Inventory systems are utilized by many entities for storing and managing inventory. For example, some retailers may utilize a warehouse of goods-to-person systems (also referred to as inventory holders, racks, pods, etc.) that store items in various containers (also referred to as bins, storage locations, etc.). Items may be stowed in the various containers to hold the item(s) in preparation for picking. For example, when an order for a specific item needs to be fulfilled by a retailer, the item can be picked (or retrieved) from the container where the item is stowed.

Inventory systems according to embodiments described herein use a robotic system to stow an item into a goods-to-person system, such as an inventory holder (or rack or pod) having multiple containers (or bins). In one embodiment, the robotic system includes multiple robotic gantries that permit various sensors, tools, and/or end effectors to interact with one or more containers supported by the inventory holder, where each container may have any number of items. For example, the robotic system can use one or more of the robotic gantries to move the sensors, tools, and/or end effectors to a particular container to stow an item into the container.

The container(s) may include retaining elements—e.g., an elastic band or flap—that secures the items in the container(s). The robotic system can include an access tool for displacing (or opening) the retaining element(s) of a particular container so that another robotic end effector can stow the item into the container. The access tool may be supported by a robotic gantry that can move the access tool to a particular container and the robotic end effector may be supported by another robotic gantry that can move the robotic end effector (including one or more tools of the robotic end effector) to the particular container.

The robotic system includes sensors (also referred to as perception sensors), which can be used to analyze an environment within the robotic system. For example, the sensors can be used to capture images of the inventory holder(s) within the robotic system, the containers within each inventory holder(s), a holding area containing items in queue waiting to be stowed into containers, and so on. In embodiments described herein, the robotic system may analyze the images using one or more machine learning techniques and/or computer vision techniques to determine a state of the environment within the robotic system. For example, the robotic system can identify available (e.g., unoccupied) space for items within the containers from the images, identify occupied space within the containers from the images, identify a description of the available space within the containers from the images, identify the arrangement of (existing) items within the containers, identify the number of items within the containers, identify the types of items in the containers, identify the number of items within the holding area, identify the type of items within the holding area, and the like.

In some embodiments, the robotic system can generate a plan for stowing an item from the holding area into a container, based on evaluating the state of the environment using machine learning techniques and/or computer vision techniques. For example, the robotic system can select optimal positions within a container for stowing a given item, generate placement motions for the robotic end effector to stow the item into the selected position. Additionally or alternatively, in some embodiments, the robotic system can identify an optimal displacement location within a selected container for displacing retaining element(s) securing items within the container.

In some embodiments, the robotic system can control the robotic gantries (including various tools, sensors, and/or end effectors on the robotic gantries) to stow the item into the container according to the plan. For example, the robotic system can control the access tool on a first robotic gantry to displace the retaining element(s) at the optimal displacement location for the selected container, control one or more tools of the end effector on a second robotic gantry to grasp an item from the holding area, and control the one or more tools of the end effector on the second robotic gantry to stow (or place) the grasp item into the placement location within the selected container. The robotic system may control the end effector to perform a motion primitive in order to stow the item into the placement location. As used herein, a motion primitive may refer to a motion strategy that the robotic system uses to interact with the environment. Examples of motion strategies include, but are not limited to, a slot wedge motion, a bin sweep motion, a page turn motion, etc.

In certain embodiments, for each stow cycle, the robotic system can select the container in which to stow an item, the placement position within the container, and/or the motion primitive to use for stowing the item into the container in the placement position in order to satisfy a predetermined condition. The predetermined condition may be based on at least one of a target unit per hour (UPH), a target volume utilization rate, a number of previous stow success, etc.

Note that as used herein, an "item" may refer to an individual item, multiple items, a package containing an individual item, a package containing multiple items, etc. As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 is a block diagram of an example inventory system 100, according to one embodiment. The inventory system 100 may be located in a facility (e.g., warehouse, factory, distribution center, etc.). The inventory system 100 includes a control system 110, one or more drive units 120 (also referred to as autonomous surface vehicles, autonomous robotic vehicles, mobile drive units, etc.), one or more holding areas 130 1-K, one or more inventory holders 160 (also referred to as a rack or pod), and one or more workcells 150 1-N (also referred to as robotic workcells, robotic stowing stations, or stowing stations) within a workspace 170.

The inventory system 100 is capable of moving inventory items between locations within the workspace 170 to facilitate the entry, processing, and/or removal of inventory items from the inventory system 100 and the completion of other tasks involving the inventory items. Here, for example, the workspace 170 represents an area associated with the inventory system 100 in which the drive units can move and/or the inventory holders 160 can be stored. In one particular embodiment, the workspace 170 may represent all or part of the floor of a fulfillment center in which the inventory system 100 operates. Although FIG. 1 shows, for the purposes of illustration, an embodiment of the inventory system 100 in which the workspace 170 includes a fixed, predetermined, and finite physical space, particular embodiments of the inventory system 100 may include drive units 120 and inventory holders 160 that are configured to operate within a workspace 170 that is of variable dimensions and/or of an arbitrary geometry. Similarly, while FIG. 1 illustrates a particular embodiment of the inventory system 100 in which the workspace 170 is entirely enclosed in a building, alternative embodiments may utilize workspaces 170 in which some or all of the workspace 170 is located outdoors, on a vehicle (such as a cargo ship), or otherwise unconstrained by any fixed structure.

The control system 110 assigns tasks to appropriate components of the inventory system 100, and coordinates operation of the various components in completing the tasks. These tasks may relate to the movement and processing of inventory items, including but not limited to, stowing items into one or more containers of one or more inventory holders 160 in preparation for picking operations, shipping operations, etc. For example, the control system 110 can generate and transmit task assignments 140 (or commands) to selected components to trigger completion of the relevant tasks. Each task assignment 140 defines one or more tasks to be completed by a particular component. The tasks may relate to the retrieval, storage, movement, stowing, etc., of inventory items. Depending on the component and task to be completed, a particular task assignment 140 may identify locations, components, and/or actions associated with the corresponding tasks and/or any other appropriate information to be used by the relevant component in completing the assigned task.

With respect to the drive units 120 specifically, the control system 110 may, in particular embodiments, communicate task assignments 140 to selected drive units 120 that identify one or more destinations for the selected drive units 120. For example, the control system 110 may communicate a task assignment 140 that identifies (and defines) the location of an inventory holder 160 within a holding area 130 (e.g., holding area 130-1). The task assignment 140 may instruct the drive unit 120 to retrieve the inventory holder 160 within the holding area 130, to transition (or move) the inventory holder 160 to a workcell 150 (e.g., workcell 150-1 or another location), and to hold (or park) the inventory holder 160 within the workcell 150 until receiving another task (or command). In some embodiments, the task assignment 140 may instruct the drive unit 120 to transition the inventory holder 160 to another location after the robotic stowing operation is completed.

Although shown in FIG. 1 as a single, discrete component, the control system 110 may represent multiple components and may represent or include portions of other elements of the inventory system 100 (e.g., workcell 150). As a result, any or all of the functionality of the control system 110 that is described herein may, in particular embodiments, represent functionality of a workcell 150 (e.g., a controller (or control system) within the workcell 150).

Each of the inventory holders 160 stores inventory items of the inventory system 100. In a particular embodiment, the inventory holders 160 include multiple containers (or storage bins), with each container capable of holding one or more types of inventory items. The inventory holders 160 are capable of being carried, rolled, and/or otherwise moved by the drive units 120. The inventory items represent any objects suitable for storage, retrieval, and/or processing in the inventory system 100. For the purposes of this description, "inventory items" may represent any one or more objects of a particular type that are stored in the inventory system 100. Thus, a particular inventory holder 160 is currently "storing" a particular inventory item if the inventory holder 160 currently holds one or more units of that type. As one example, the inventory system 100 may represent a mail-order warehouse facility, and inventory items may represent merchandise stored in the mail-order warehouse facility. During operation, the drive units 120 may retrieve the inventory holders 160 containing one or more inventory items that are requested in an order to be packed for delivery to a customer, or retrieve inventory holders 160 carrying pallets containing aggregated collections of inventory items for shipment. Moreover, in particular embodiments of the inventory system 100, boxes containing completed orders may themselves represent inventory items.

The workcells 150 represent locations designated for the completion of stowing operations, which can include the introduction of inventory items into the inventory holders 160. In some embodiments, one or more workcells 150 represents a location at which the inventory system 100 is externally accessible by human operator(s) and/or robotic system(s) external to the inventory system 100. By virtue of the multiple workcells 150, items can be transitioned (or inducted) to different workcells or specific workcells that are designated for handling specific types of items. For example, one or more of the workcells 150 may be designated for handling items of a certain size, items associated with a particular shipping location, etc. In some embodiments, certain items may be diverted away from particular workcells 150 when the items satisfy certain conditions (e.g., the items may be too large for a particular workcell).

In one embodiment, each workcell 150 includes a (robotic) stow system 180, a holding area 190, and one or more inventory holders 160. As noted, the inventory holder(s) 160 may be transitioned into a particular workcell 150 by one or more drive units 120. The stow system 180 is a robotic system that is configured perform an automated stowing operation, e.g., by grasping items from the holding area 190 and placing the items into containers of an inventory holder 160. The holding area 190 is representative of a variety of surfaces and can have any form factor suitable for holding items (e.g., table, floor, pallet, conveyor belt, container, tote, etc.). In one embodiment, the holding area 190 may include a conveyor (including a conveyor belt) that transitions items to the workcell 150 in preparation for a stowing operation.

The stow system 180 can include hardware components, software components, or combinations thereof. As described below, in some embodiments, the stow system 180 includes multiple robotic gantries that are configured to (1) move sensors, tools, and/or end effectors to the holding area 190 to grasp an item from the holding area 190 and (2) move the sensors, tools, and/or end effectors to a particular container of an inventory holder 160 to stow the item into the container. Note the stow system 180 is described in more detail below with respect to FIG. 2. Note that the inventory system 100 depicted in FIG. 1 is a reference example of a system in which the robotic workcell described herein can be deployed and that the robotic workcell can be used in other systems and/or environments (e.g., grocery stores, retail stores, etc.).

Figure 2:
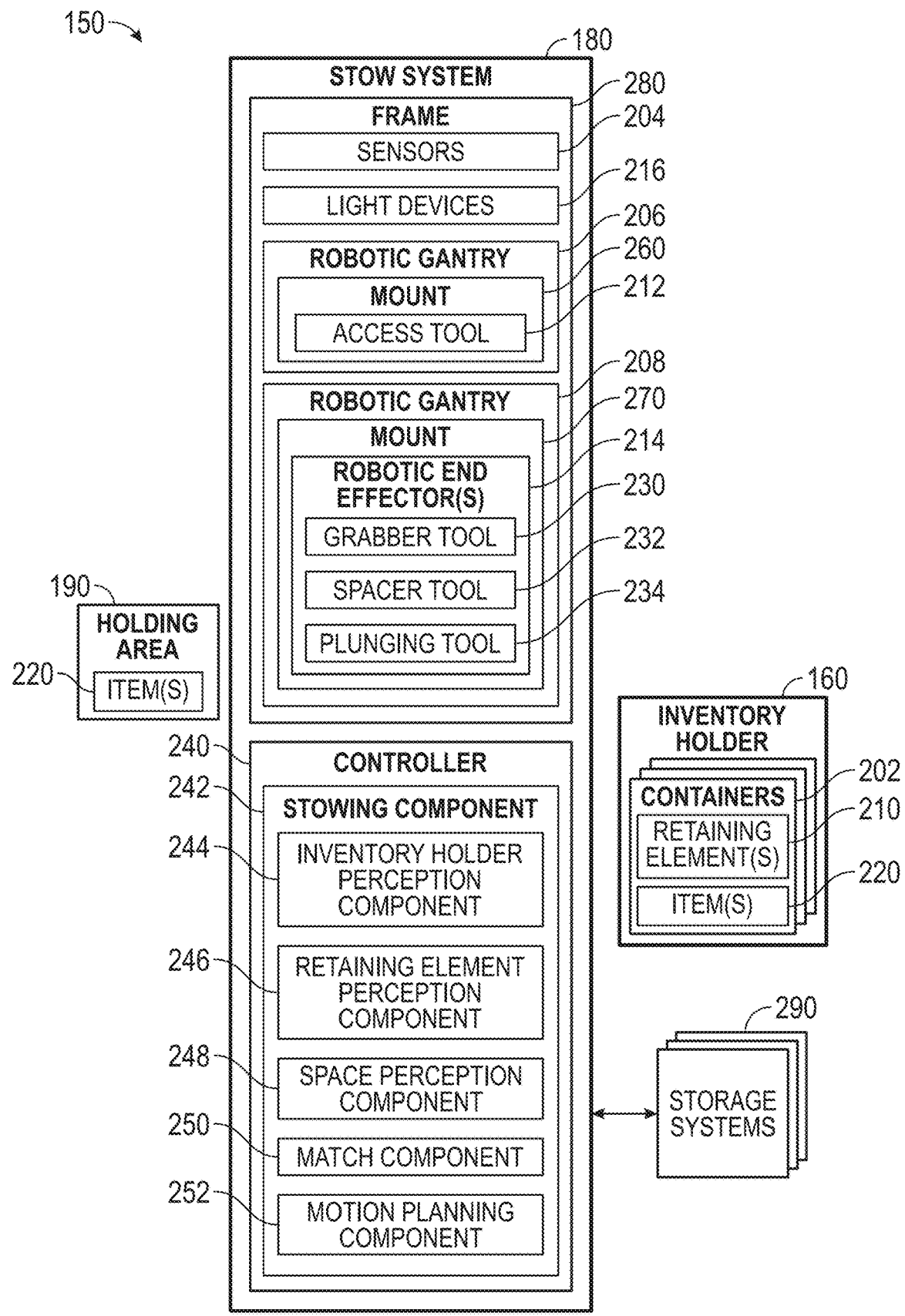
FIG. 2 is a block diagram of a workcell, according to one embodiment.

FIG. 2 is a block diagram of a workcell 150, according to one embodiment. Although one workcell 150 is depicted, there may be any number of workcells 150 located in a given facility. The holding area 190 includes one or more items 220 that are available to be stowed (via the stow system 180) into containers 202 of the inventory holder 160. In some embodiments, the inventory holder 160 can have containers 202 on multiple sides of the inventory holder 160. In such embodiments, the different sides of the inventory holder 160 can be accessed via a drive unit 120 (not shown in FIG. 2) spinning the inventory holder 160 so that each side of the inventory holder 160 can face the stow system 180. In one embodiment, the drive unit 120 can move the inventory holder to a position proximate to the stow system 180, e.g., to enable the tools and/or end effectors of the robotic gantries to stow items into the containers 202.

As shown in this particular embodiment, the stow system 180 of the workcell 150 includes a frame 280, which can support one or more sensors 204, one or more light devices 216, a robotic gantry 206, and a robotic gantry 208. The robotic gantry 206 can provide multiple degrees of freedom for extending the workspace of various tools and/or end-effectors attached to the robotic gantry 206. In one embodiment, the robotic gantry 206 provides two-axis motion (e.g., vertical and horizontal) so that the mount 260 can be moved to any location within a two-dimensional (2D) plane established by the horizontal and vertical sides of the robotic gantry 206. That is, a bottom, horizontal side of the robotic gantry 206 can move the vertical side of the robotic gantry 206 in the horizontal direction, thereby changing the horizontal displacement of the mount 260 (which is attached to the vertical side). In parallel, the vertical side can move the mount 260 up and down. In this manner, the robotic gantry 206 can move the mount 260 (and various elements supported by the mount 260) in a 2D area.

Similarly, the robotic gantry 208 can provide multiple degrees of freedom for extending the workspace of various tools and/or end-effectors attached to the robotic gantry 208. In one particular embodiment, the robotic gantry 208 provides two-axis motion so that the mount 270 can be moved to any location within a 2D plane established by the horizontal and vertical sides of the robotic gantry 208. In this manner, the robotic gantry 208 can move the mount 270 (and various elements supported by the mount 270) in a 2D area.

The robotic gantries 206, 208 can include one or more sensors 204, light devices 216, tools, and/or end effectors to enable the stow system 180 to grasp an item 220 from the holding area 190 and stow the item 220 into one of the containers 202 of the inventory holder 160. Here, for example, the robotic gantry 208 includes a robotic end effector 214, which is attached to (or supported by) the mount 270. The robotic end effector 214 is representative of a variety of different types of robotic components, including, for example, robotic arms, linearly movable components, components having a single degree of freedom, components having multiple degrees of freedom, etc.

In one embodiment, the robotic end effector 214 includes a grabber tool 230, which is configured to grasp an item 220 from the holding area 190. In one particular embodiment, the grabber tool 230 includes two plates, which can engage an item 220 by squeezing the item 220 between the two plates. Additionally, the robotic end effector 214 can use the grabber tool 230 to insert a grasped item 220 into a location within the container 202. In embodiments where the grabber tool 230 includes two plates, the grabber tool 230 can change an orientation of the two plates in order to insert the item 220 into the container 202. After inserting the item 220 into the container 202, the grabber tool 230 can open the two plates, allowing the grabber tool 230 to retract while the item 220 stays in its stowed position. More details describing an EOAT with two plates for grasping and stowing an item into a container can be found in U.S. patent application Ser. No. 17/039,253, filed Sep. 30, 2020, which is expressly incorporated by reference herein in its entirety for all purposes.

In one embodiment, the robotic end effector 214 includes a spacer tool 232, which can create space for stowing an item into the container 202. For example, if the container 202 is densely packed (e.g., there is little empty space due to currently stowed items), the robotic end effector 214 can use the spacer tool 232 to create space in the container 202. In one embodiment, the spacer tool 232 may be configured to shift items to one side of the container 202, create space between two items in the container 202, etc. In general, the spacer tool 232 can perform various different motion primitives in order to rearrange currently stowed items in the container 202 to create space in the container. In one embodiment, the spacer tool 232 includes a flat shaped end effector (e.g., a plate) which can be inserted into the container and can manipulate items. In another embodiment, the spacer tool 232 can include two plates, which can be inserted into the container 202 in order to create space for a new item. More details describing a spacer tool for creating space for stowing an item into a container can be found in U.S. patent application Ser. No. 17/037,068, filed Sep. 29, 2020, which is expressly incorporated by reference herein in its entirety for all purposes.

In one embodiment, the robotic end effector 214 includes a plunging tool 234, which can aid in inserting an item into a container 202 and/or aid in keeping an item stowed by the grabber tool 230 within the container 202. In one particular embodiment, the plunging tool 234 can extend between two plates of the grabber tool 230 and engage a grasped item. The plunging tool 234 may apply a force to the grasped item, such that the grasped item is inserted into the container 202. The plunging tool 234 may continue applying the force to the inserted item, while the grabber tool 230 is retracted from the container 202. In this manner, embodiments can reduce chances of the stowed item being accidently pulled out with the grabber tool 230. More details describing a plunging tool can be found in U.S. patent application Ser. No. 17/039,253, filed Sep. 30, 2020.

In some embodiments, at least some of the containers 202 (of an inventory holder 160) may include retaining element(s) 210 that secure the items within the containers 202. For example, the retaining element(s) 210 may be disposed at (and extend across) an opening of the containers 202 to reduce the chance of the items in the container 202 falling out, such as when the drive unit 120 is moving the inventory holder 160. The retaining element(s) 210 may be an elastic material and can include any suitable material, including, for example, plastic, rubber, fabric, etc. In some embodiments, the retaining element(s) 210 may be translucent, allowing the sensors 204 to capture an image of the contents of container 202 through the retaining element(s) 210. In other embodiments, the retaining element(s) 210 may be non-translucent.

In scenarios where the inventory holder 160 includes retaining element(s) 210, the items within the containers 202 are less likely to fall from the containers 202, e.g., if the inventory holder 160 is jostled or accelerated. At the same time, the retaining element(s) 210 may also block the one or more other end effectors (e.g., grabber tool 230, spacer tool 232, plunging tool 234, etc.) from interacting with item(s) in the container and/or block one or more sensors 204 from capturing an accurate view or image of the inside of the container 202 (e.g., in situations where the retaining element(s) 210 are non-translucent).

Accordingly, in some embodiments, the robotic gantry 206 includes an access tool 212, which is attached to (or supported by) the mount 260. In embodiments where a retaining element(s) 210 blocks access to a container 202 and/or obstructs the field of view of the sensor(s) 204, the access tool 212 can displace the retaining element(s) 210 by, e.g., grabbing, pushing, or opening the retaining element so that the retaining element no longer blocks the other end effectors and/or the field of view of the sensor(s) 204. After an item 220 is stowed into a container 202, the access tool 212 can release or reengage the retaining element 210 so that the items remaining in the container 202 are less likely to fall out of the container. More details describing retaining elements and an access tool configured to displace retaining elements can be found in U.S. patent application Ser. No. 17/037,068, filed Sep. 29, 2020.

The sensor(s) 204 may include a visual sensor (e.g., camera), depth sensor, infrared sensor, barcode reader, force sensing sensor, pressure sensor, gyroscope, accelerometer, or combinations thereof. The sensor 204 can be any sensor (or combination of sensors) that permits the stow system 180 (or components of the stow system) to identify items in a holding area 190, identify the type or number of items in the holding area 190, identify a pose (e.g., position and orientation) of the items in the holding area 190, identify occupied versus empty/unoccupied space in a container 202, identify the arrangement (including pose) of items in the container 202, identify the type or number of items in the container, identify the individual items in the container 202, determine an orientation of the robotic end effector 214, determine an amount of force being applied to an item (via the robotic end effector 214), and the like.

The stow system 180 can include multiple sensors 204, disposed at different angles and locations to provide different views of the various components within the workcell 150. For example, a first set of perception sensors 204 may be disposed in a set of locations within the workcell 150 to provide a view of the holding area 190, a second set of perception sensors 204 may be disposed in a set of locations within the workcell 150 to provide a view of the inventory holder 160 (including views of the various containers 202), etc. In one particular embodiment, the stow system 180 includes at least three sensors 204 (e.g., cameras), each positioned at a different height within the workcell 150. For example, a first sensor (e.g., first camera) may be positioned at a first height in order to capture an image of a first set of containers 202 of the inventory holder 160, a second sensor (e.g., second camera) may be posited at a second height (greater than the first height) in order to capture an image of a second set of containers 202 of the inventory holder 160, and a third sensor (e.g., third camera) may be positioned at a third height (greater than the first and second heights) in order to capture an image of a third set of containers 202 of the inventory holder 160. In this example, the first set of containers 202 may be located in a bottom region (or section) of the inventory holder 160, the third set of containers 202 may be located in a top region (or section) of the inventory holder 160, and the second set of containers 202 may be located in a middle region (or section) of the inventory holder 160 between the bottom and top regions. Note that although FIG. 2 illustrates the sensors 204 being located on the frame 280 of the stow system 180, one or more of the sensors 204 may be disposed elsewhere within the workcell 150.

The light devices 216 are generally configured to illuminate different areas of the workcell 150. In one embodiment, the light devices 216 are positioned at various locations within the workcell 150 to provide illumination of the containers 202 of the inventory holder 160. The light devices 216 can include various types of light devices, including, for example, light emitting diodes (LEDs), incandescent, halogen, fluorescent, etc. In some embodiments, the light devices 216 are configured to provide illumination of the inventory holder 160 that is sufficient to enable the sensor(s) to perceive the contents of a container 202 behind the retaining element(s) 210 securing the contents of that container 202. For example, the light devices 216 may be configured to provide an illuminance of at least 1000 lux. Additionally, the light emitted by the light devices 216 may be highly diffuse with low jitter in order to enable the sensor(s) 204 to have visibility through the retaining element(s) 210 to the contents of a container 202. Note that although FIG. 2 illustrates the light devices 216 being located on the frame 280 of the stow system 180, one or more of the light devices 216 may be disposed elsewhere within the workcell 150.

The stow system 180 also includes a controller 240 for controlling the stow system 180. The controller 240 includes a stowing component 242, which is configured to implement one or more techniques described herein for performing a robotic stowing operation. The stowing component 242 can include hardware components, software components, or combinations thereof.

Here, the stowing component 242 includes an inventory holder perception component 244, a retaining element perception component 246, a space perception component 248, a match component 250, and a motion planning component 252, each of which is described in more detail below. Using one or more of these components, the stowing component 242 can identify an optimal position for displacing a retaining element(s) 210 securing items within a container, identify available space within a container for items waiting to be stowed into the inventory holder 160, select optimal positions for stowing items within the container (e.g., positions that meet certain predefined conditions), generate a motion plan for stowing the item in the container, and control the various tools and/or end effectors of the stow system 180 to perform the motion plan.

In some embodiments, the stow system 180 may interact with one or more storage systems 290, which are generally representative of storage locations (e.g., databases) that may store information associated with the inventory system. For example, one of the storage systems 290 may include a database containing a manifest of existing items within the inventory holder 160. In this example, the manifest may include, for each item within a container, an indication of an item identifier (ID) (e.g., Amazon Standard Identification Number (ASIN)), type of item, attributes of the item (e.g., size, dimensions, etc.), and so on. In another example, one of the storage systems 290 may include a database containing a manifest of items waiting to be stowed. In this example, the manifest can include, for each item waiting to be stowed, an indication of an item ID (e.g., ASIN), type of item, attributes of the item (e.g., size, dimensions, etc.), and so on. Although the storage systems 290 are shown as external to the stow system 180, one or more of the storage systems 290 may be located within the stow system 180, one or more of the storage systems 290 may be located in a cloud computing environment, etc.

Figure 18:
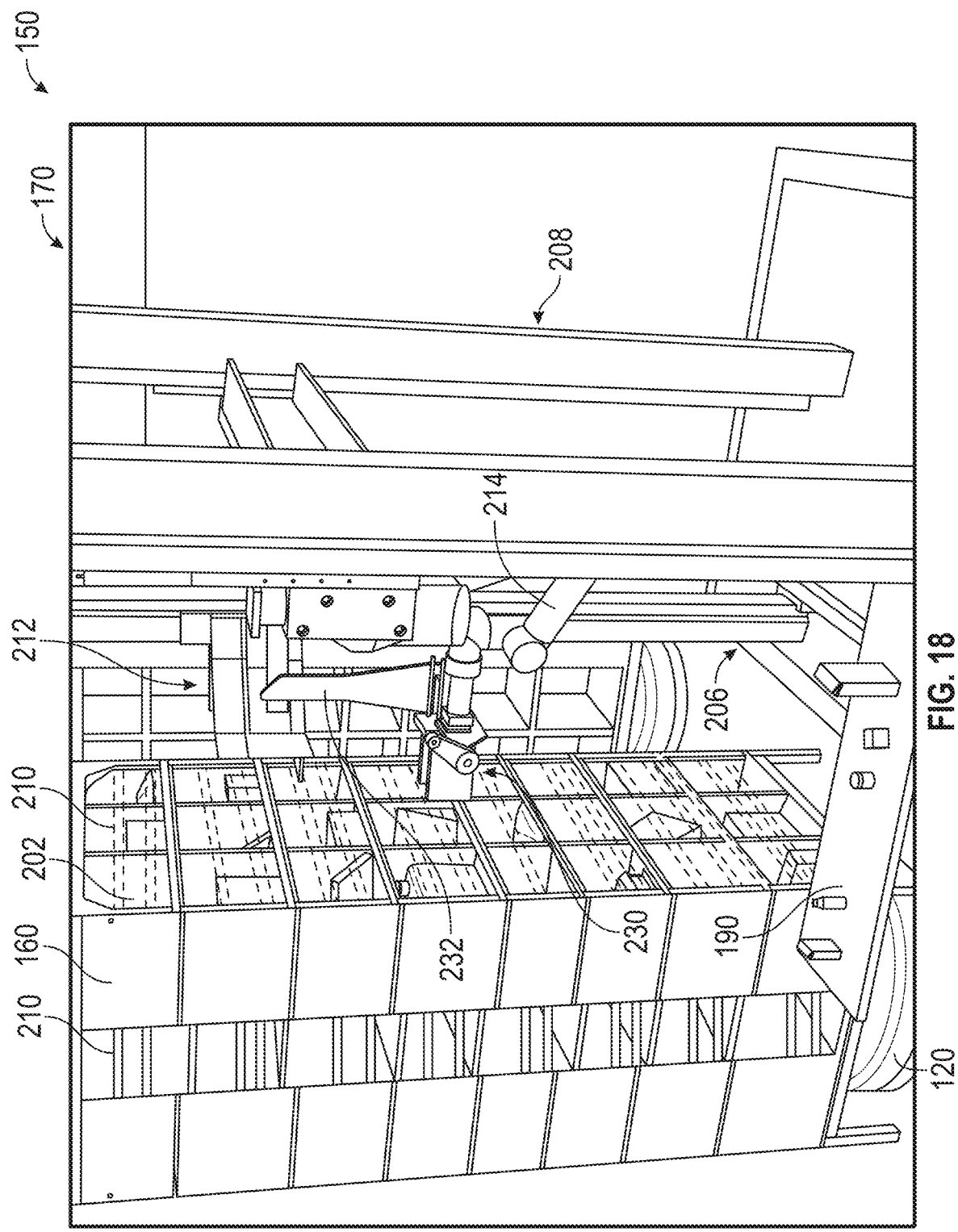
FIG. 18 illustrates a perspective view of an example robotic workcell, according to one embodiment.

Note that more details describing the workcell 150 (including the stow system 180) can be found in in U.S. patent application Ser. No. 17/541,778, filed Dec. 3, 2021, which is expressly incorporated by reference herein in its entirety for all purposes. Additionally, note that FIG. 2 illustrates merely a reference example configuration a workcell 150 and that other configurations of the workcell 150 consistent with the functionality described herein can be used. A perspective view of an example robotic workcell 150 is illustrated in FIG. 18.

Figure 3:
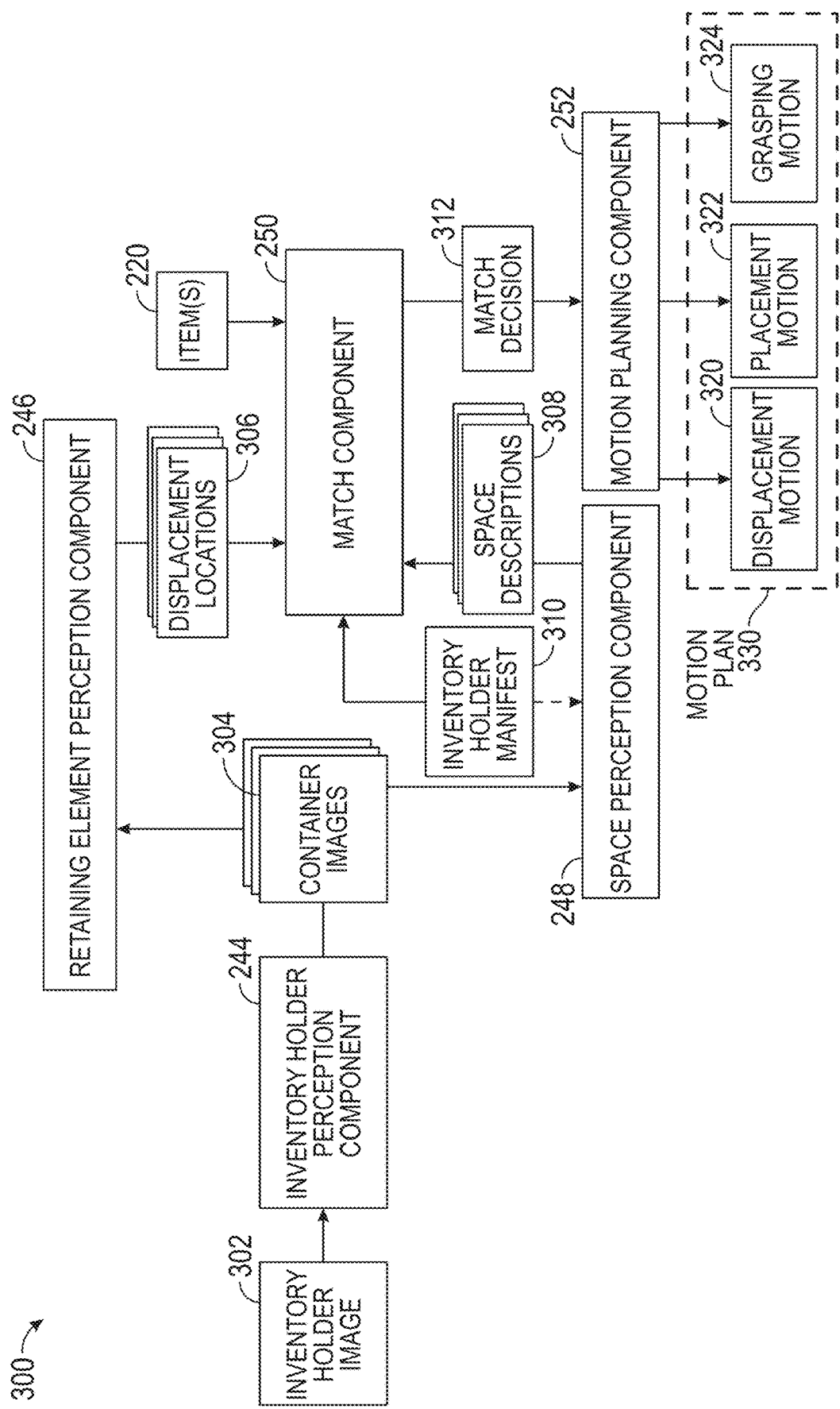
FIG. 3 is a block diagram of a workflow for generating a plan for stowing an item into a container, according to one embodiment.

FIG. 3 illustrates a block diagram of a workflow 300 for generating a plan for stowing an item 220 into a container 202, according to one embodiment. The workflow 300 may be performed by the stowing component 242.

As part of the workflow 300, the inventory holder perception component 244 may obtain an image of the inventory holder 160 (shown as inventory holder image 302). In one embodiment, the inventory holder image 302 may be an image of a front facing side of the inventory holder 160 (e.g., the side of the inventory holder 160 facing the stow system 180) captured by a single sensor 204. In another embodiment, the inventory holder image 302 may be an image of the front facing side of the inventory holder 160 that is generated from multiple images captured by multiple sensors 204. For example, a first image of the inventory holder 160 may be captured from a first sensor 204 (e.g., a bottom (height) camera of robotic gantry 206/208), a second image of the inventory holder 160 may be captured from a second sensor 204 (e.g., a middle (height) camera of robotic gantry 206/208), and a third image of the inventory holder 160 may be captured from a third sensor 204 (e.g., a top (height) camera of robotic gantry 206/208). The first image, second image, and third image may then be registered (e.g., using an image registration algorithm to put the images into a same coordinate system) in order to generate the inventory holder image 302.

The inventory holder perception component 244 may generate an image of each container 202 (collectively shown as container images 304), based on the inventory holder image 302. In one embodiment, the inventory holder perception component 244 can use machine learning techniques and/or image processing techniques to generate the container images 304 from the inventory holder image 302. Note, the inventory holder perception component 244 is described in more detail below with respect to FIG. 4.

The container images 304 are provided to the retaining element perception component 246 and the space perception component 248, which are generally representative of independent processing pipelines (or operations). The retaining element perception component 246 is generally configured to identify the retaining element(s) 210 within each container 202 from the container images 304 and to identify the optimal displacement location (satisfying a predetermined condition) within the container 202 for displacing the retaining element(s) 210 (e.g., using the access tool 212). The optimal displacement location for each container is collectively shown as displacement locations 306. Note, the retaining element perception component 246 is described in more detail below with respect to FIG. 6.

The space perception component 248 is generally configured to identify an amount of available space in each container 202, identify an amount of occupied space in each container 202, determine a description of the available space in each container 202, and determine a description of the occupied space in each container, based on the container images 304. As described below in one embodiment, the space perception component 248 may identify the amount of available space by segmenting out the occupied space within each container 202 from the respective container image 304 of the container 202.

The space perception component 248 may then generate a description of the available space and/or the occupied space within each container (collectively shown as space descriptions 308), using one or more image processing and/or computer vision techniques on the segmented container images. Each space description 308 can include at least one of (i) an indication of the occupied space within the container, (ii) an indication of the unoccupied space within the container, or (iii) a container signature. The container signature may include a signature of the occupied space within the container and/or a signature of the unoccupied space within the container.

As shown, in some embodiments, the space perception component 248 may access information within an inventory holder manifest 310 in order to generate the space descriptions 308. The inventory holder manifest 310 is generally a manifest of existing items within the inventory holder 160. The inventory holder manifest 310 may include, for each item within a container, an indication of an item identifier (ID) (e.g., ASIN), type of item, attributes of the item (e.g., size, dimensions, whether the item is compressible, etc.), and so on. Note the space perception component 248 is described in more detail below with respect to FIG. 8.

The match component 250 is generally configured to determine (or select) a container 202 from the available containers within the inventory holder 160 to stow an item 220 from the holding area. The match component 250 may evaluate at least one of (i) the displacement locations 306, (ii) item(s) 220, (iii) attributes of the item(s) 220 (obtained from the inventory holder manifest 310), (iv) space descriptions 308, or (v) information of the existing items (obtained from the inventory holder manifest 310) with one or more machine learning techniques to determine a match decision 312. As described below, the match decision 312 may include at least one of a particular container ID (corresponding to the selected container 202), an item ID (corresponding to the selected item 220), a displacement location for displacing retaining elements of the container ID, a space description for the container ID, a motion strategy for stowing (or inserting) the selected item 220 into the container ID, or a motion strategy for grasping a selected item 220 from a holding area 190. Note the match component 250 is described in more detail below with respect to FIG. 10.

The motion planning component 252 is generally configured to generate a motion plan 330 (also referred to as a motion policy) for controlling the stow system 180 to stow a given item into a container according to the match decision 312. The motion plan 330 may specified the planned control for the entire stowing operation cycle, from grasping of a selected item 220 from the holding area 190, to displacing the retaining element(s) 210 of a selected container 202, to inserting the selected item 220 into the selected container 202. As shown, the motion plan 330 includes a displacement motion 320, a placement motion 322, and a grasping motion 324. The displacement motion 320 may include a command for controlling the access tool 212 to displace the retaining element(s) 210 at a displacement location 306 of the selected container 202. The placement motion 322 may include a motion for controlling the tools and/or end-effectors of the stow system 180 to insert the selected item 220 into the selected container 202. The grasping motion 324 may include a motion for controlling the tools and/or end-effectors of the stow system 180 to grasp a selected item 220 from the holding area 190. Note the motion planning component 252 is described in more detail below with respect to FIG. 12.

Note that while the workflow 300 is shown as being performed with a certain number of components (e.g., inventory holder perception component 244, retaining element perception component 246, space perception component 248, match component 250, and motion planning component 252), in other embodiments, the workflow 300 may be implemented with a different number of components.

Figure 4:
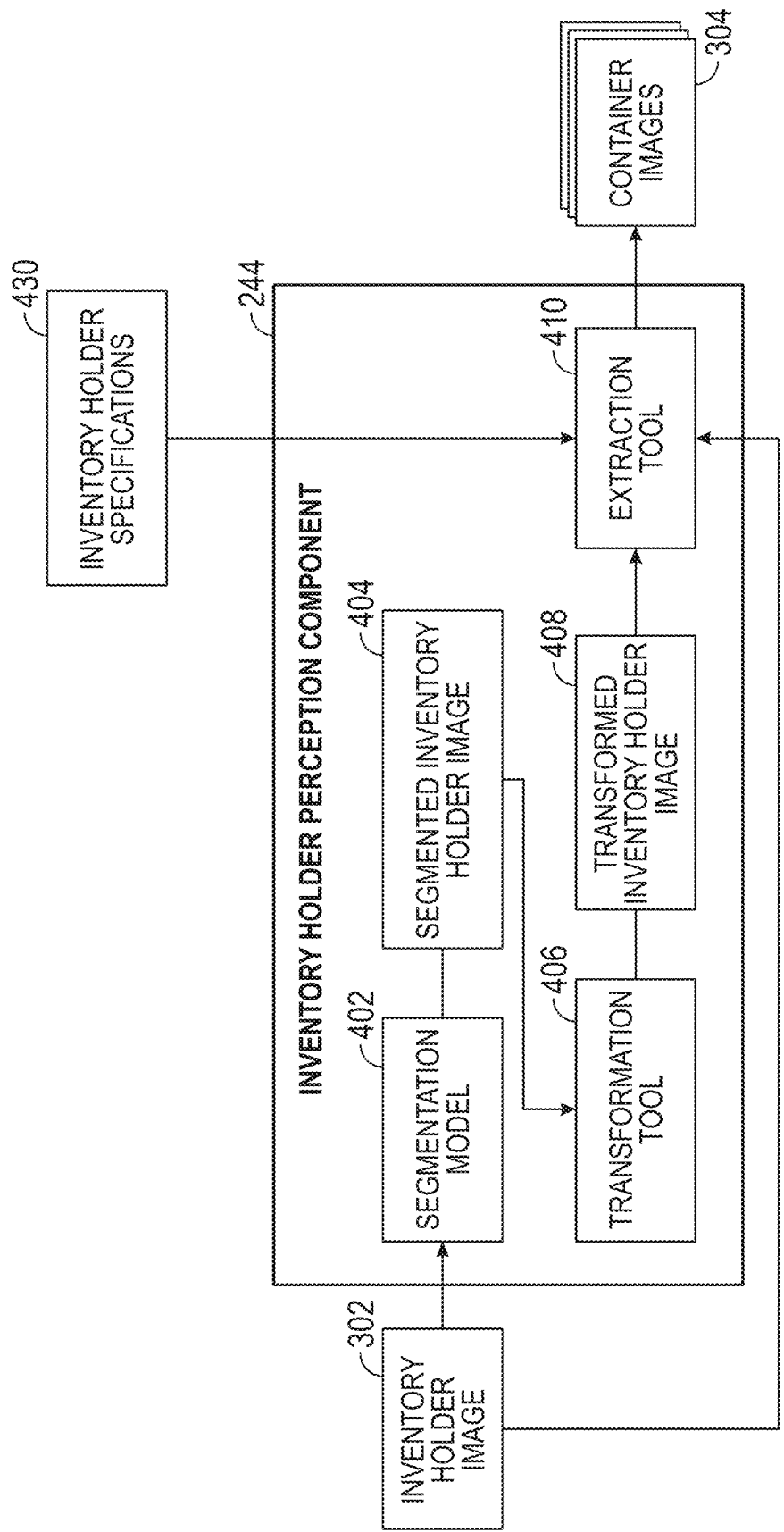
FIG. 4 is a block diagram of an inventory holder perception component, according to one embodiment.

FIG. 4 further illustrates components of the inventory holder perception component 244, described relative to FIG. 3, according to one embodiment. As shown, the inventory holder perception component 244 includes a segmentation model 402, a transformation tool 406, and an extraction tool 410, each of which can include hardware, software, or combinations thereof.

The segmentation model 402 is generally configured to perform semantic image segmentation on the inventory holder image 302 to segment out the boundaries of the inventory holder, the containers, and barcode labels. In one embodiment, the segmentation model 402 is a deep convolutional neural network (CNN)-based semantic segmentation model. Here, the segmentation model 402 receives the inventory holder image 302 and outputs a segmented inventory holder image 404. The segmented inventory holder image 404 is generally a mask, which includes, for each pixel, a label of the corresponding class of what is represented (e.g., inventory holder, containers, barcode labels, etc.). The segmented inventory holder image 404 may have the same dimensions as the inventory holder image 302.

Figure 5A:
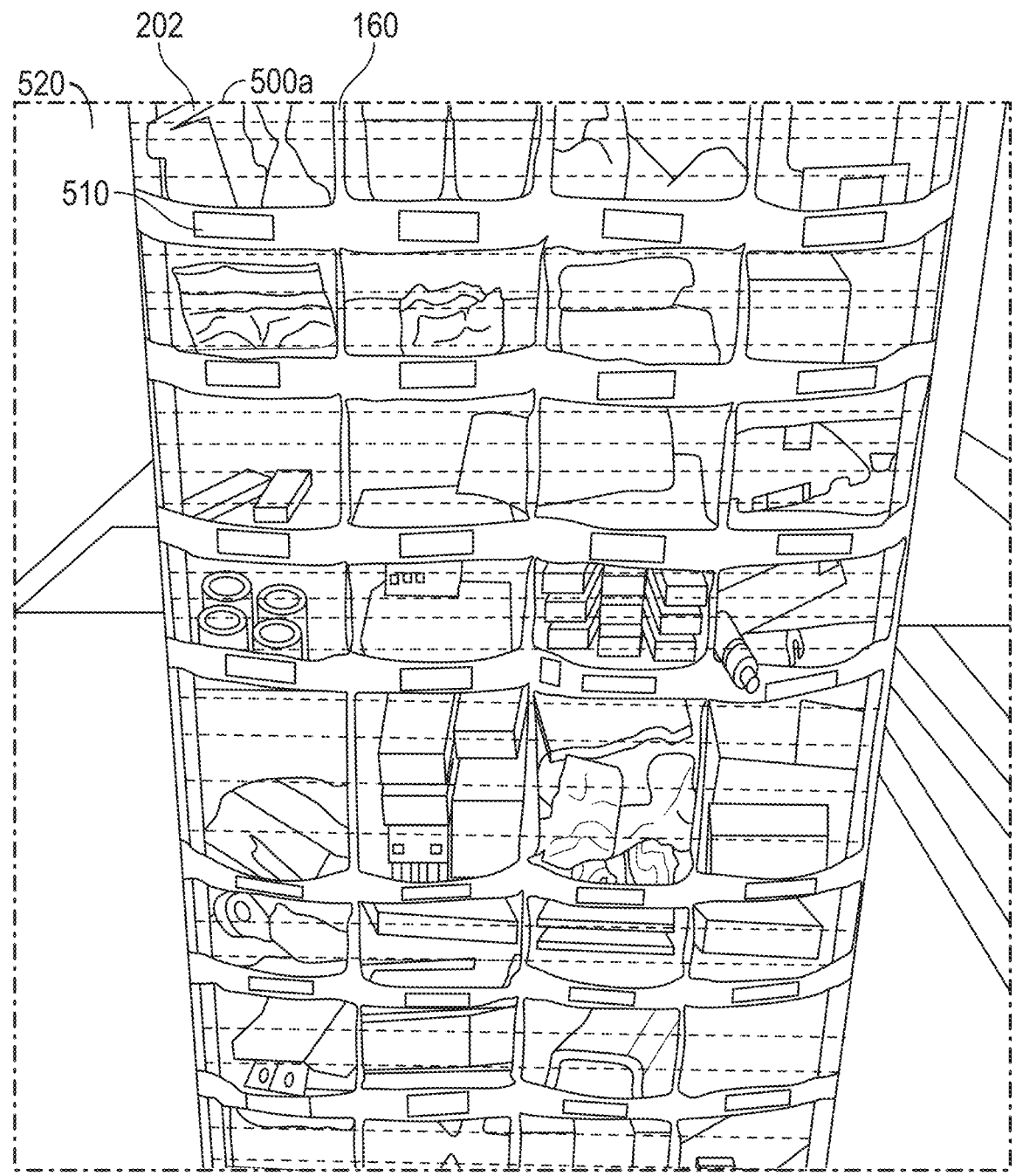
FIGS. 5A-5D illustrate example images generated as part of operations performed by the inventory holder perception component, according to one embodiment.
Figure 5B:
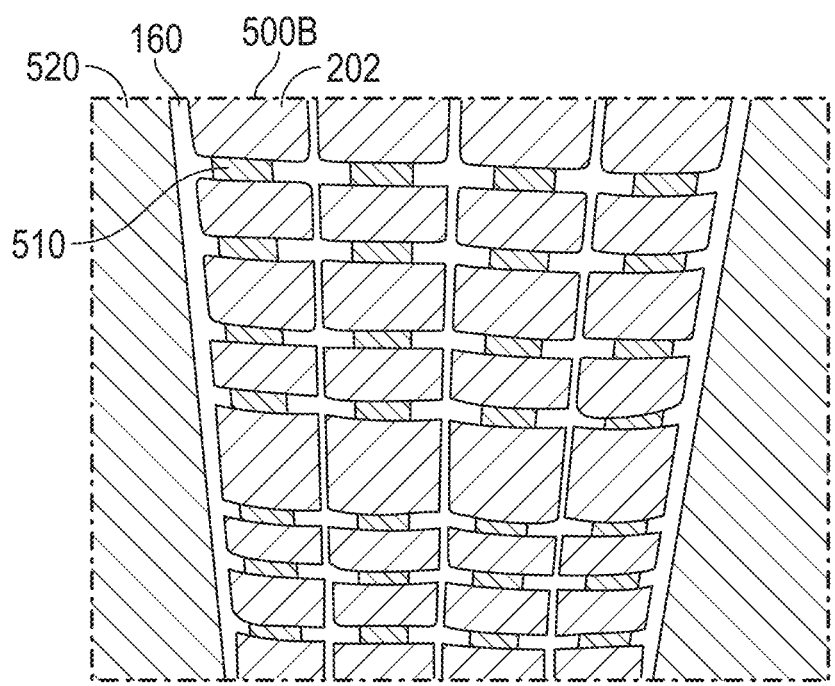

Referring briefly to FIGS. 5A-5B, assuming the segmentation model 402 receives the image 500A depicted in FIG. 5A (as the inventory holder image 302), the segmentation model 402 can output the mask 500B depicted in FIG. 5B (as the segmented inventory holder image 404). For each pixel in the mask 500B, the pixel has a first value (e.g., "0") if the corresponding pixel in the original image 500A is outside the inventory holder 160 (e.g., background 520), the pixel has a second value (e.g., "1") if the corresponding pixel in the original image 500A is the frame (or edges) of the inventory holder 160, the pixel has a third value (e.g., "2") if the corresponding pixel in the original image 500A is the container 202, and the pixel has a fourth value (e.g., "3") if the corresponding pixel in the original image 500A is the barcode label 510.

Figure 5C:
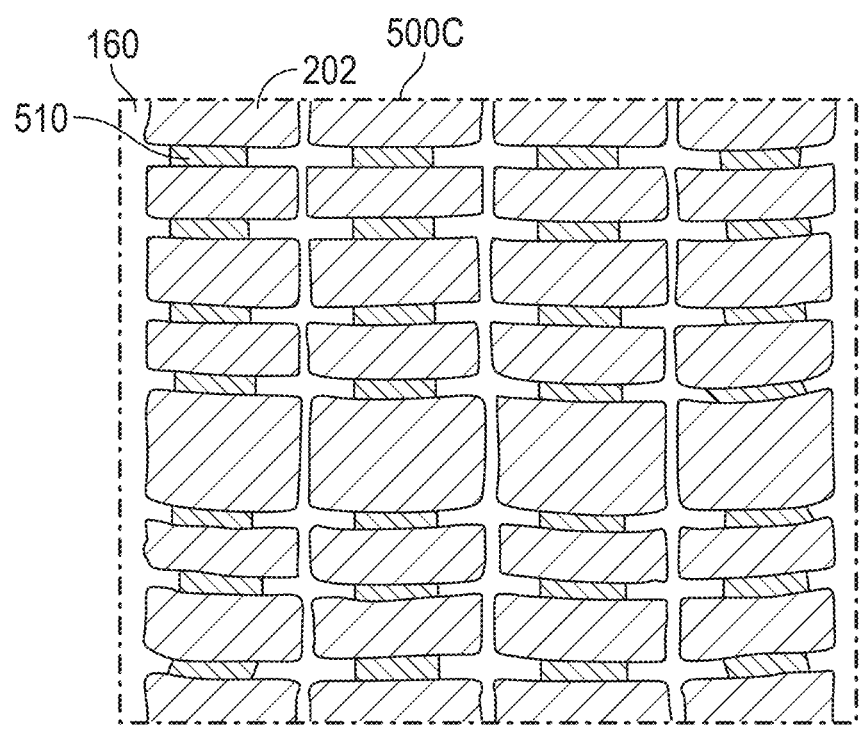
Figure 5D:
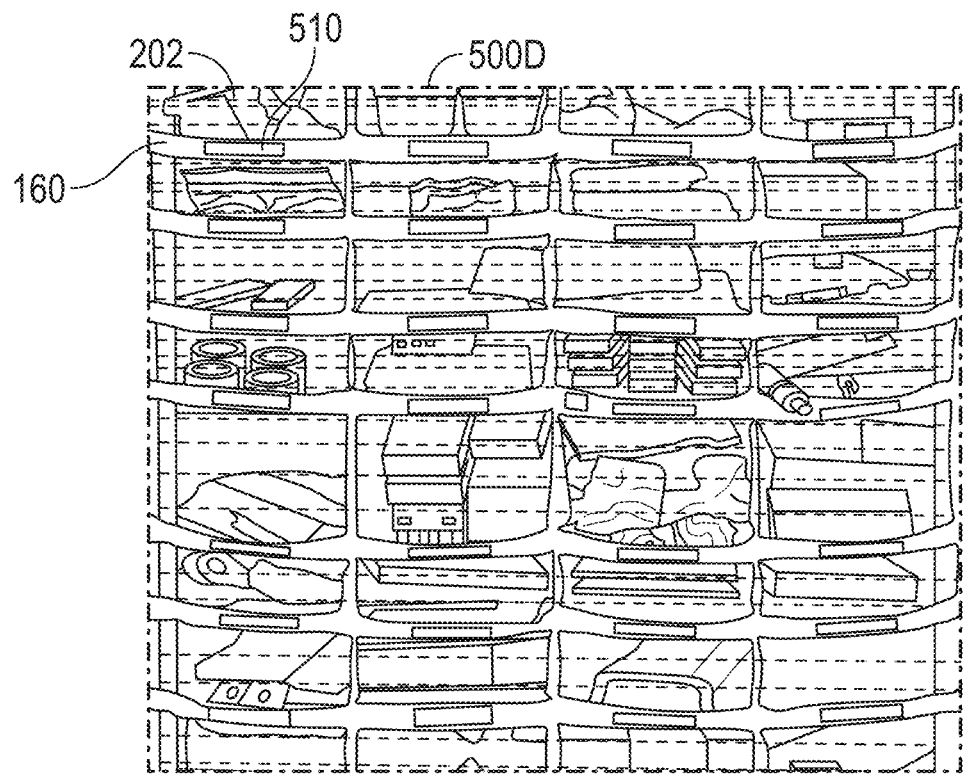

Referring back to FIG. 4, the transformation tool 406 is generally configured to perform one or more image processing operations (e.g., visual projection, such as a homography transformation) on the segmented inventory holder image 404 in order to generate a transformed inventory holder image 408. In one embodiment, the transformed inventory holder image 408 is a homography corrected image of segmented inventory holder image 404. In this embodiment, the transformation tool 406 performs a homography transformation on the segmented inventory holder image 404 in order to unwarp the segmented inventory holder image 404. FIG. 5C illustrates an example of an image 500C, which is a homography corrected version of the mask 500B illustrated in FIG. 5B. In some embodiments, the homography transformation may also be used to transform (e.g., unwarp) the inventory holder image 302. FIG. 5D, for example, illustrates an image 500D, which is a homography corrected version of the original image 500A illustrated in FIG. 5A.

The extraction tool 410 is generally configured generate an image of each container 202, based at least in part on the inventory holder image 302, inventory holder specifications 430, and the transformed inventory holder image 408. The inventory holder specifications 430 may be based on a model of inventory holders used within the inventory system and may include an indication of the inventory holder's size, the inventory holder's dimensions, container locations (e.g., physical coordinates) within the inventory holder, etc. The inventory holder specifications 430 may be obtained from a storage system 290.

In one embodiment, the extraction tool 410 may generate each container image 304 by applying the transformed inventory holder image (e.g., image 500C) to the inventory holder image 302 to extract the pixels belonging to each container 202. The extraction tool 410 may fuse the visual projection (e.g., homography) and container locations (from the inventory holder specifications 430) to estimate the image coordinates of each container in three-dimensional (3D) space.

Figure 6:
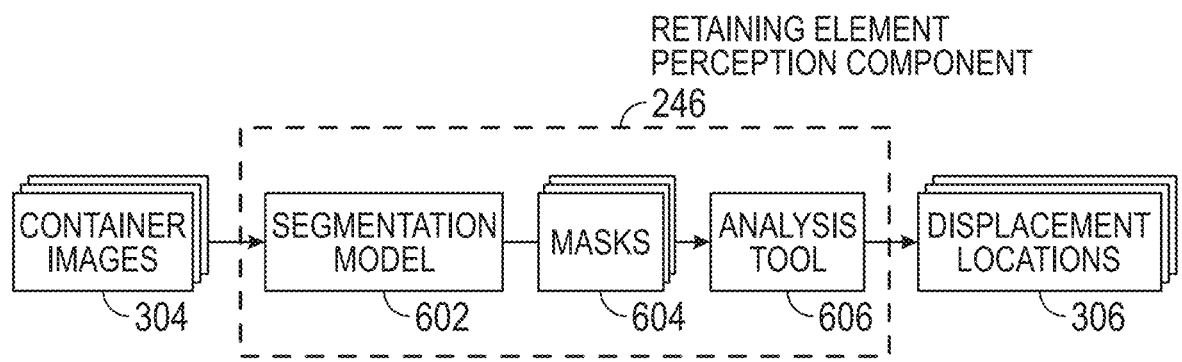
FIG. 6 is a block diagram of a retaining element perception component, according to one embodiment.

FIG. 6 further illustrates components of the retaining element perception component 246, described relative to FIG. 3, according to one embodiment. As shown, the retaining element perception component 246 includes a segmentation model 602 and an analysis tool 606, each of which can include hardware, software, or combinations thereof. For each container image 304, the segmentation model 602 performs semantic segmentation to segment out the retaining element(s) 210 from the container image 304. In one embodiment, the segmentation model 602 is a deep CNN-based semantic segmentation model.

Here, the segmentation model 602 receives the container images 304 and outputs the masks 604, where each mask 604 corresponds to a different container image 304. In one embodiment, each mask 604 is a binary mask, which includes, for each pixel, a label of the corresponding class of what is represented (e.g., retaining element 210, non-retaining element 210). Briefly referring to FIG. 7A, assuming the segmentation model 602 receives the container image 304-1, the segmentation model can generate the mask 604-1. For each pixel in the mask 604-1, the pixel has a first value (e.g., "1") if the corresponding pixel in the container image 304-1 belongs to a retaining element (e.g., retaining elements 210 1-3) and the pixel has a second value (e.g., "0") if the corresponding pixel in the container image 304-1 does not belong to a retaining element.

Figure 7B:
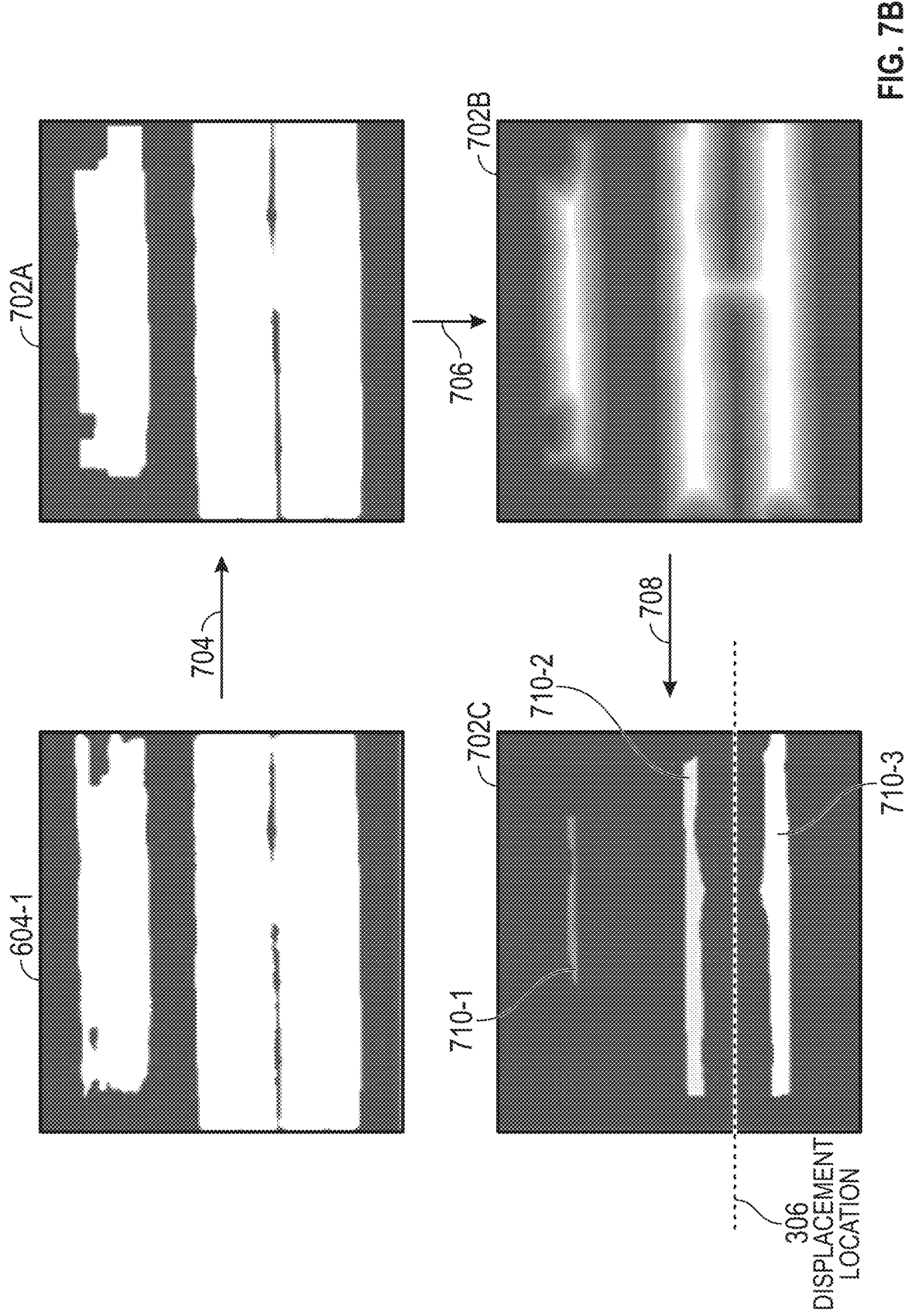

The analysis tool 606 is generally configured to determine an optimal displacement location for displacing the retaining element(s) 210 of each container, based on the respective mask 604. In one embodiment, the analysis tool 606 is configured to perform one or more image processing operations on the masks 604 in order to determine the optimal displacement locations 306. Referring to FIG. 7B, the analysis tool 606 may receive the mask 604-1, which is a raw image output from the segmentation model 602. The analysis tool 606 may then perform an image processing operation 704 on the mask 604-1 to generate an image 702A. In one embodiment, the image processing operation 704 may be an opening (e.g., morphological opening) operation that removes (or at least reduces) a number of stray pixels within the mask 604-1.

The analysis tool 606 may perform an image processing 706 on the image 702A to generate an image 702B. In one embodiment, the image processing operation 706 may include a skeletonization algorithm that reduces the foreground regions in the image 702A (e.g., a binary image) to a skeletal remnant that preserves the extent and connectivity of the original region while throwing away most of the original foreground pixels (e.g., as shown in the image 702B). The skeletonization algorithm may be implemented by using a distance transform on the image 702A, where the skeleton lies along the singularities in the distance transform.

The analysis tool 606 may perform an image processing operation 708 on the image 702B to generate the image 702C. In one embodiment, the image processing operation 708 may include a thresholding operation. In one embodiment, the analysis tool 606 may performing clustering on the image 702C to identify clusters 710 1-3 corresponding to retaining elements 210 1-3, respectively. The analysis tool 606 may then determine the maximum separating plane (e.g., the horizontal maximum-margin separating line) between the bottom two clusters (e.g., clusters 710 2-3) and use the maximum separating plane as the displacement location 306. In embodiments where an image includes a single cluster, the analysis tool 606 may determine the maximum separating plane between the single cluster and a bottom edge of the container as the displacement location 306.

As shown in image 702C, the displacement location 306 is a two-dimensional (2D) horizontal line. In one embodiment, the analysis tool 606 may convert the 2D horizontal line into a 3D location, based at least in part on the physical coordinates of the respective container (e.g., determined from the inventory holder specifications 430). For example, the analysis tool 606 can obtain an estimate of where the inventory holder is relative to the sensor(s) 204 and project the 2D coordinates into a 3D position onto a plane. The 3D position may then be used as the displacement location 306.

Figure 8:
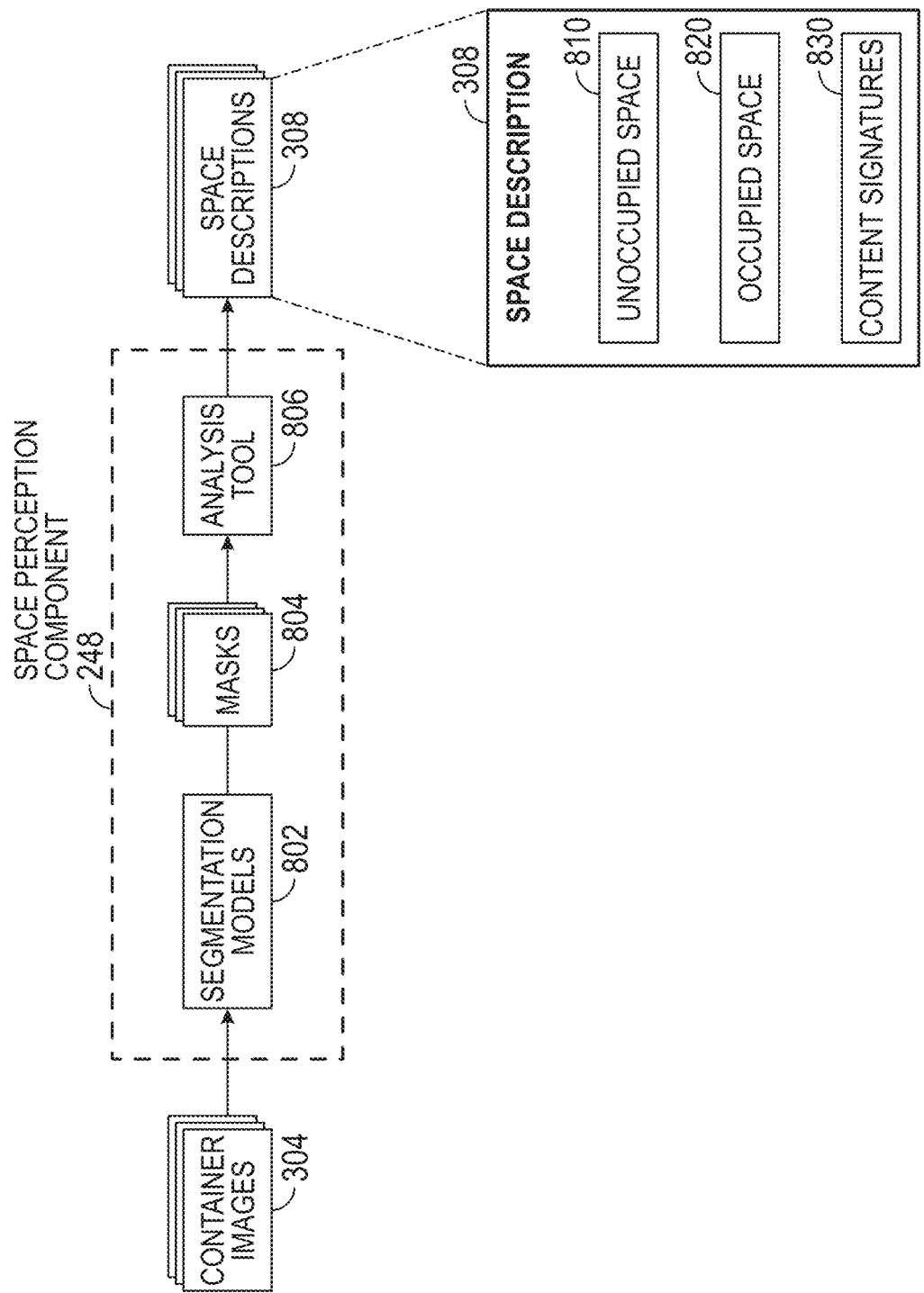
FIG. 8 is a block diagram of a space perception component, according to one embodiment.

FIG. 8 further illustrates components of the space perception component 248, described relative to FIG. 3, according to one embodiment. As shown, the space perception component 248 includes one or more segmentation models 802 and an analysis tool 806, each of which can include hardware, software, or combinations thereof.

In one embodiment, the one or more segmentation models 802 includes a semantic segmentation model configured to segment out the occupied space and unoccupied space within each of the container images 304. In this embodiment, the semantic segmentation model may be a deep CNN-based semantic segmentation model. The semantic segmentation model may output, for each container image 304, a mask 804 (e.g., binary mask), which includes, for each pixel, a label of the corresponding class of what is represented (e.g., occupied space or non-occupied space). In one reference example shown in FIG. 9, assuming the segmentation model 802 (e.g., semantic segmentation model) receives the container image 304-1, the segmentation model 802 can generate the mask 804-1, which is a binary mask. For example, for each pixel in the mask 804-1, the pixel has a first value (e.g., "1") if the corresponding pixel in the container image 304-1 belongs to occupied space 820 and the pixel has a second value (e.g., "0") if the corresponding pixel in the container image 304-1 belongs to unoccupied space 810.

Referring back to FIG. 8, the analysis tool 806 is configured to generate a space description 308, based on the mask 804 for each container image. Each space description 308 may include an indication of the unoccupied space 810, an indication of the occupied space 820, and a content signature 830. In one embodiment, the analysis tool 806 can overlay the mask 804 with the container image 304 to generate an image overlay, for example, as shown in the image 910 of FIG. 9. The analysis tool 806 may analyze the image 910 with one or more image processing techniques to identify the content signature 830 for the container.

Figure 9:
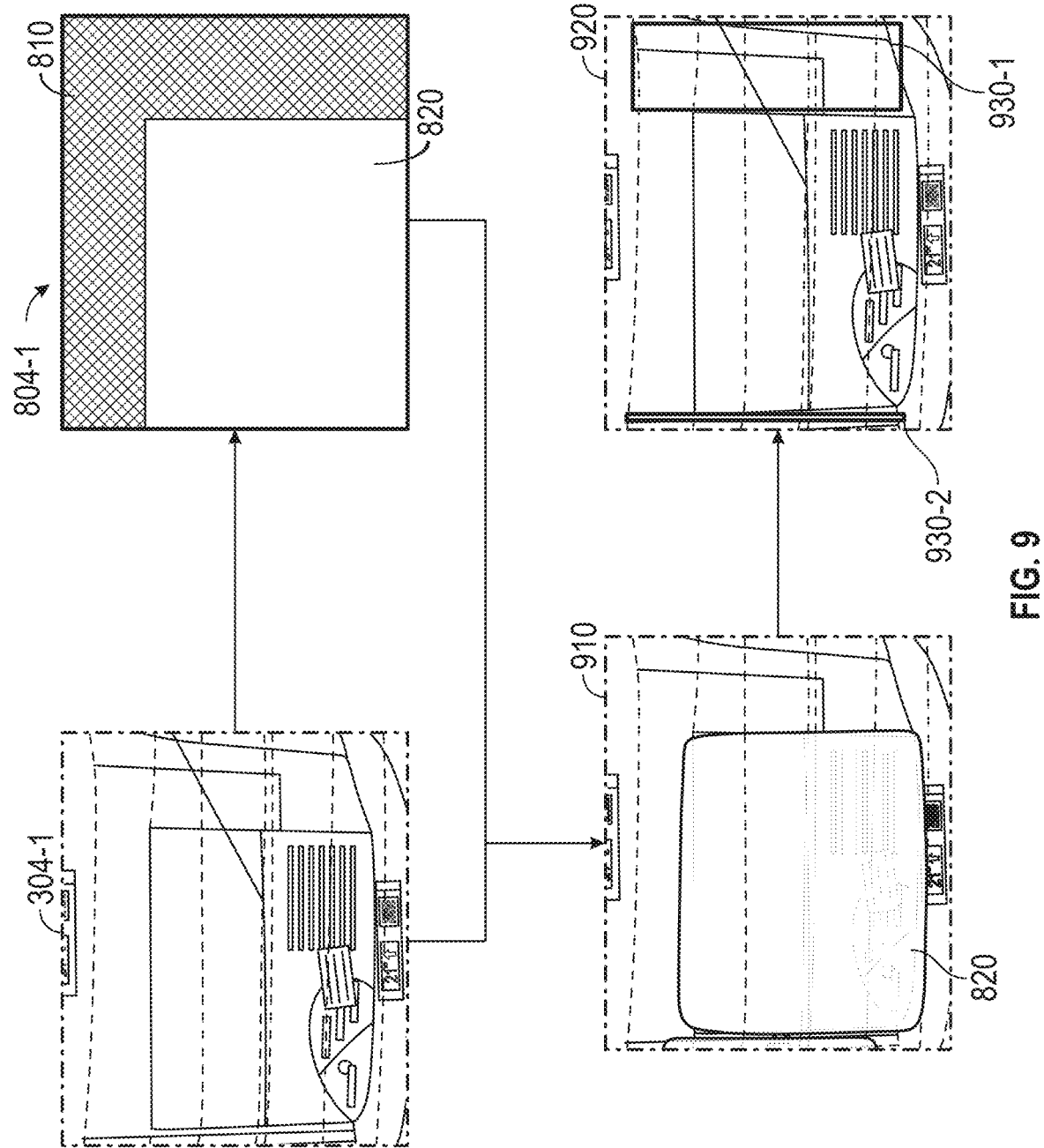
FIG. 9 depicts a sequence of operations for a space perception component, according to one embodiment.

In one embodiment, the content signature 830 can include a description of the unoccupied space 810. For example, the content signature 830 can indicate whether the unoccupied space 810 is fractured, can indicate one or more regions that can be created within the container, etc. In one reference example shown in FIG. 9, the image 920 (generated by the analysis tool 806) indicates a vertical slot region 930-1 and a vertical slot region 930-2, each of which may be indicative of the amount of space available for stowing an item 220. In one embodiment, the vertical slot region 930-1 may indicate placement of an item 220 using an insert maneuver with an end effector (e.g., grabber tool 230 and/or plunger tool 234), whereas the vertical slot region 930-2 may indicate placement for a sweep maneuver with an end effector (e.g., spacer tool 232). Note that while FIG. 9 depicts the regions as vertical slot regions, the regions may have a different shape (e.g., horizontal, convex, polygon, etc.).

In one embodiment, the one or more segmentation models 802 includes an instance segmentation model configured to determine a number of instances of existing items within the occupied space of each of the container images 304. In this embodiment, the mask 804 can indicate, for each pixel, the object instance it belongs to. That is, compared to semantic segmentation, instance segmentation can differentiate multiple objects with the same label class labels. In embodiments where the segmentation models 802 perform instance segmentation, the content signature 830 can include a description of the occupied space 820. For example, the content signature 830 can indicate whether the occupied space 820 includes tipped items, stacked items, compressible items, etc.

Figure 10:
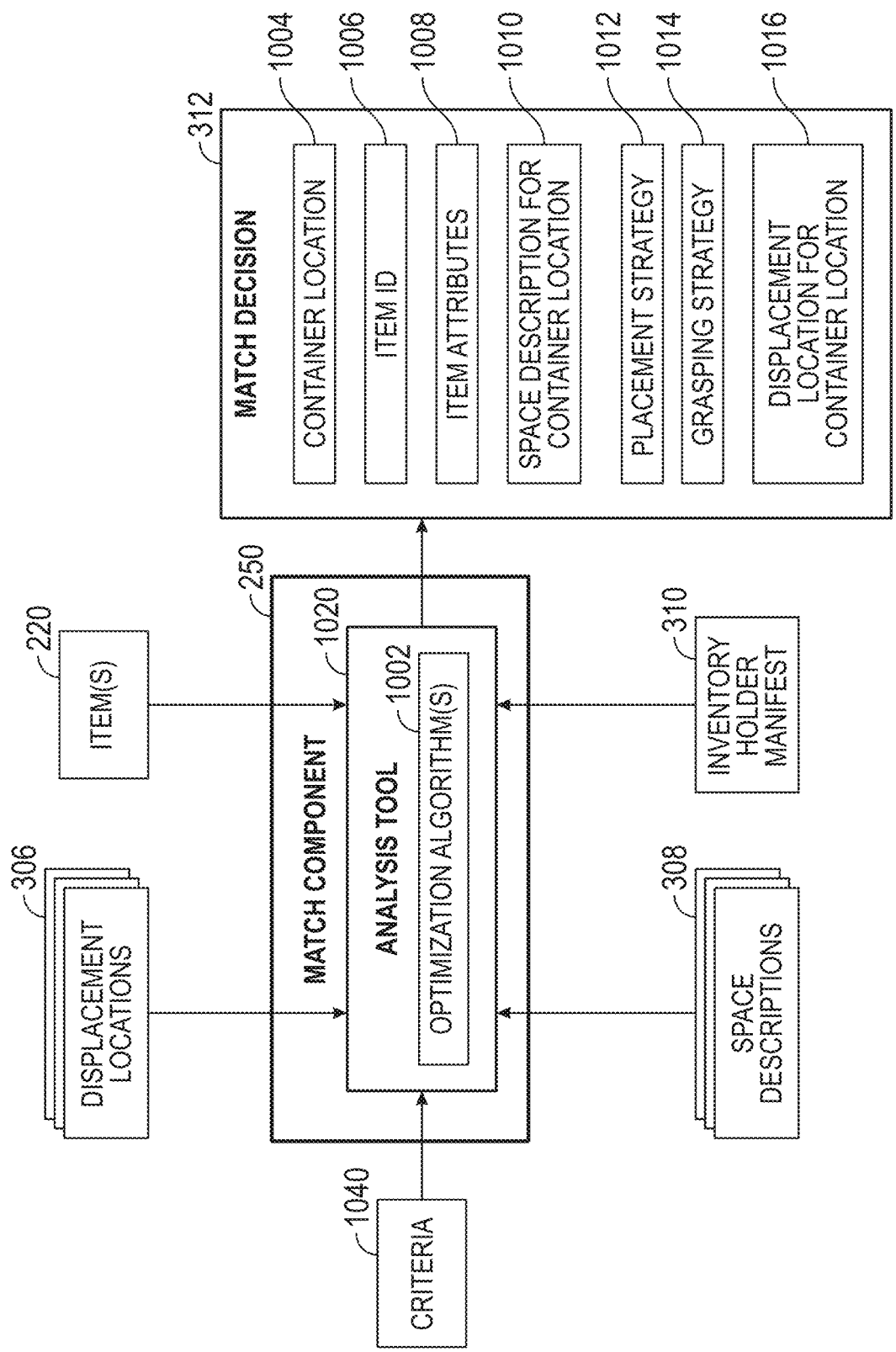
FIG. 10 is a block diagram of a match component, according to one embodiment.

FIG. 10 further illustrates components of the match component 250, described relative to FIG. 3, according to one embodiment. As shown, the match component 250 includes an analysis tool 1020, which can include hardware, software, or combinations thereof.

The analysis tool 1020 receives the displacement locations 306, the space descriptions 308, and an indication of item(s) 220 waiting to be stowed into the inventory holder 160. The analysis tool 1020 may also receive an indication of one or more criteria 1040, attributes of the item(s) 220, and attributes of existing items within the containers 202. The analysis tool 1020 may evaluate the input information with one or more optimization algorithms 1002 to generate the match decision 312. In one embodiment, the optimization algorithm(s) 1002 is a multi-objective optimization algorithm that jointly optimizes over one or more criteria 1040 (e.g., volume utilization, task time, and/or prior experience of stow successes).

The analysis tool 1020 may reason over multiple items 220 waiting to be stowed when generating the match decision 312. For example, the analysis tool 1020 can determine, for each container, a confidence score associated with stowing each item 220 into that container. The confidence score is a prediction of the feasibility that using a particular motion strategy will lead to successful stowing of the item into the container. After determining the confidence scores, the analysis tool 1020 may match an item to a container having the highest associated confidence score. In another embodiment, the analysis tool 1020 may match an item to a container does not have a highest confidence score among the multiple containers. In this embodiment, for a given set of items, the analysis tool 1020 can match each item to maximize or minimize a given criteria (e.g., minimize task time, maximize volume utilization, maximum number of stow successes, etc.).

In some embodiments, the optimization algorithm(s) 1002 can account for planning behaviors (specified in criteria 1040) when performing the joint optimization. For example, certain planning behaviors, such as stacking items, placing items in front of other items, etc., may be selectively enabled/disabled by operations personnel for the inventory system 100. In the case that a particular stow etiquette is enabled/disabled, the optimization algorithm 1002 can include/remove the corresponding planning behavior for the stow etiquette from the joint optimization.

The match decision 312 may include a container location 1004, an item ID 1006, item attributes 1008 (of the item ID 1006), a "space description for the container location" 1010 (referred to herein as "space description 1010"), a placement strategy 1012, a grasping strategy 1014, and a "displacement location for the container location" 1016 (referred to herein as "displacement location 1016"). The item ID is the identifier of the item 220 within the holding area 190 that is matched to the container location 1004. The item attributes 1008 may include size of the item ID 1006, dimensions of the item ID 1006, pose of the item ID 1006, type of the item ID 1006, etc. FIGS. 11A-11B illustrate different examples of a placement strategy 1012, according to one embodiment. In particular, FIG. 11A illustrates an example of a slot wedge primitive 1100A that can be used as the placement strategy 1012 and FIG. 11B illustrates an example of a bin sweep primitive 1100B that can be used as the placement strategy 1012.

Figure 12:
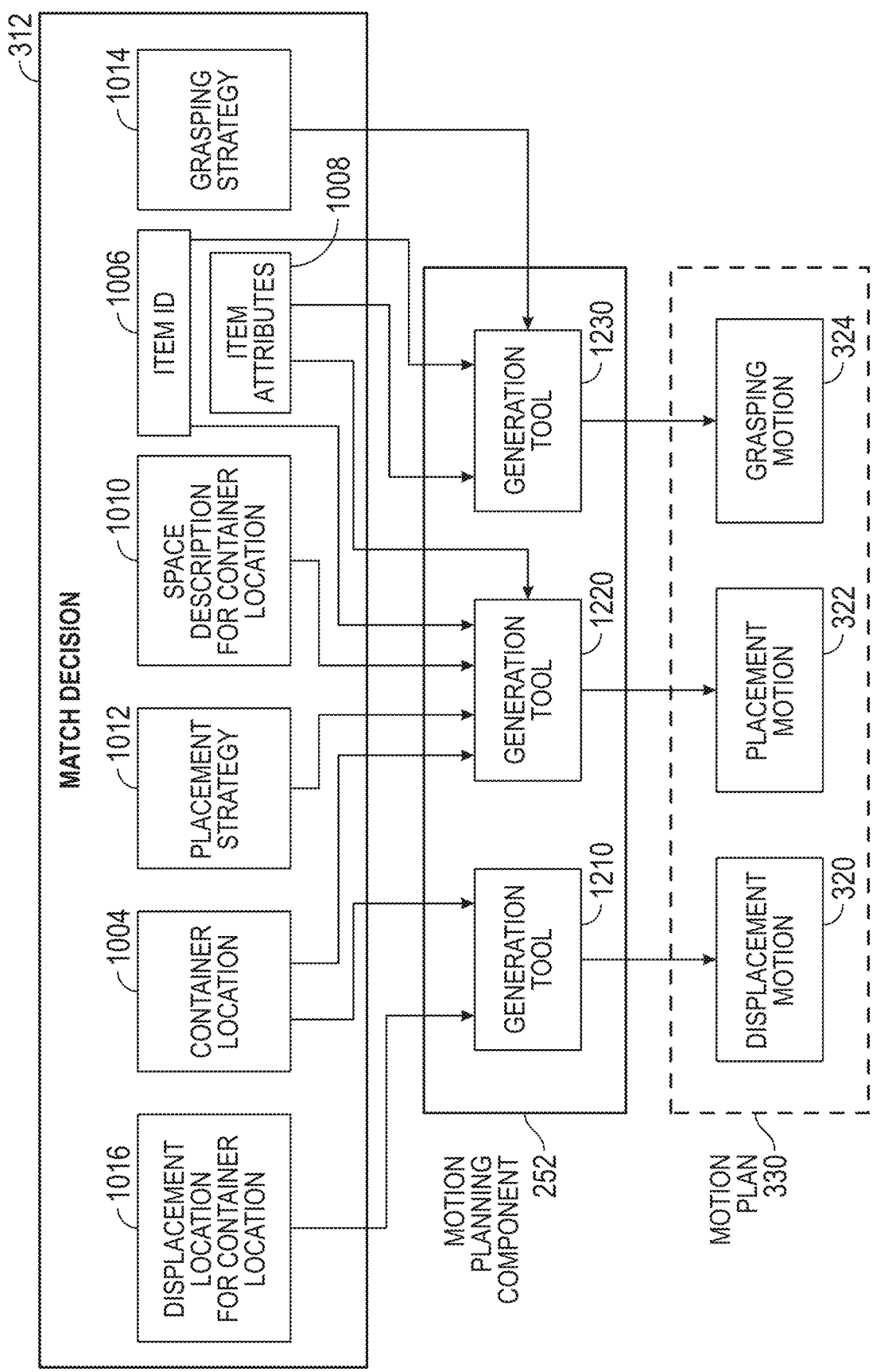
FIG. 12 is a block diagram of a motion planning component, according to one embodiment.

FIG. 12 further illustrates components of the motion planning component 252, described relative to FIG. 3, according to one embodiment. As shown, the motion planning component 252 includes a generation tool 1210, a generation tool 1220, and a generation tool 1230, each of which can include hardware, software, or combinations thereof. As noted, the motion planning component 252 is configured to generate the motion plan 330 based on the match decision 312. In particular, the generation tool 1210 is configured to generate the displacement motion 320, based on the displacement location 1016 and the container location 1004. Additionally, the generation tool 1220 is configured to generate the placement motion 322 based on the container location 1004, placement strategy 1012, the space description 1010, the item ID 1006, and item attributes 1008. Additionally, the generation tool 1230 is configured to generate the grasping motion 324, based on the item ID 1006, item attributes 1008, and the grasping strategy 1014.

In one embodiment, the motion planning component 252 can use multiple motion planners (e.g., slot wedge, bin sweep), each tailored to a different type of content signature 830 (e.g., slots, fractured space, compressibility, etc.) that is optimized for highest probability of successful stow. The motion planning component 252 can implement each motion with a hybrid 2-layer planner that uses a high-level network to select which low-level compliant movement to perform (e.g., push left, push right, slide in), based on force/torque, position, and velocity measurements. Referring again to the slot wedge primitive 1100A illustrated in FIG. 11A, the motion planner may control the stow system to insert the spacer tool and item into a slot and pries it open by rotating the spacer tool. In another example, for the bin sweep primitive 1100B illustrated in FIG. 11B, the motion planner may control the stow system to insert the grabber tool into the vertical slot and push on the existing items in the container to create space for the item to stow.

Figure 13:
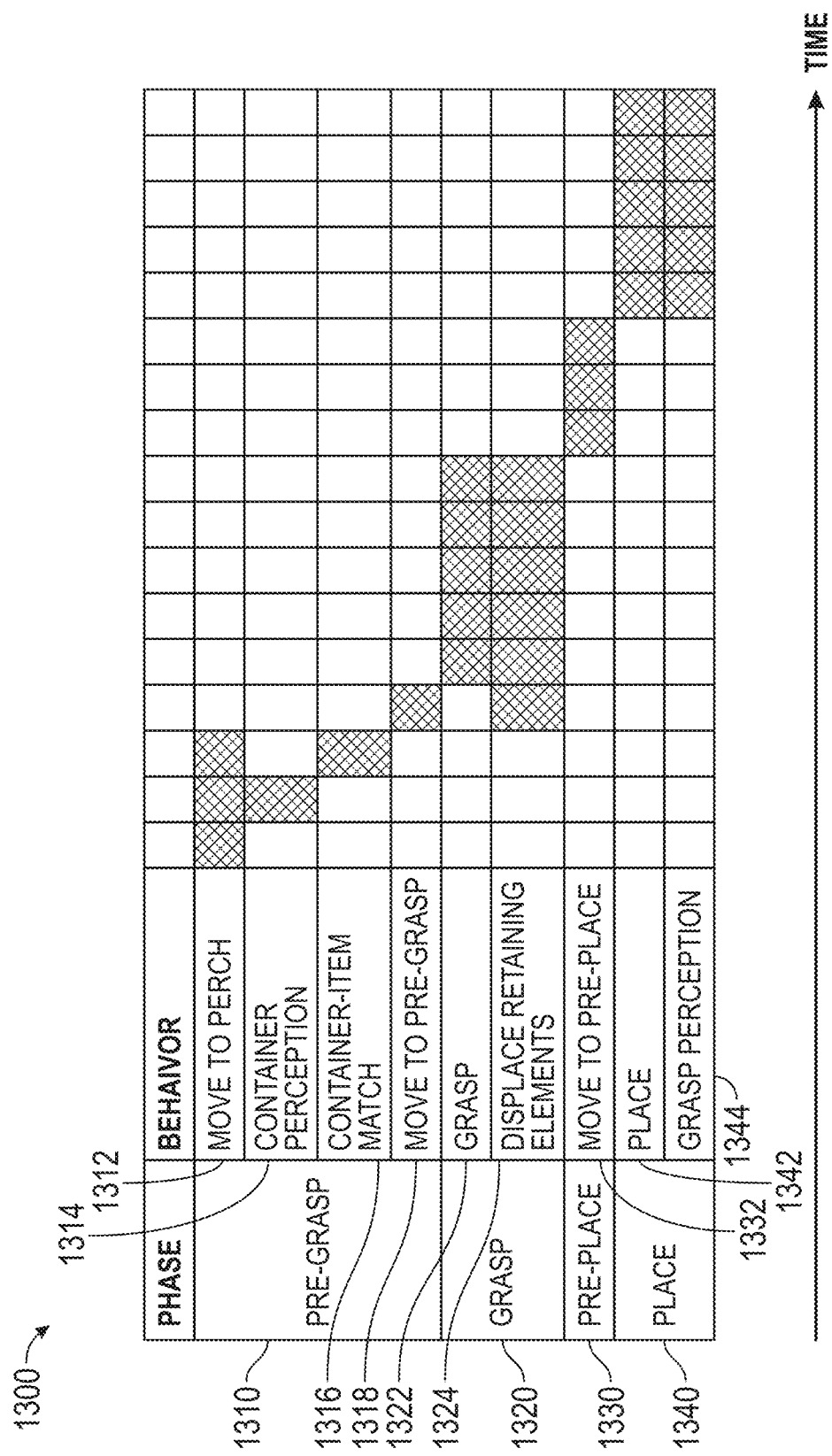
FIG. 13 illustrates an example timing diagram for performing a stow operation, according to one embodiment.

In certain embodiments, the stowing component 242 may control the stow system 180 to perform the various motions associated with the stow cycle in a manner that minimizes task time. FIG. 13 illustrates an example timing diagram 1300 of the perception and motion operations for a single stow cycle, according to one embodiment. As shown, the stow cycle includes a pre-grasp phase 1310, a grasp phase 1320, a pre-place phase 1330, and a place phase 1340. The pre-grasp phase 1310 includes a behavior (e.g. move to perch) 1312, a behavior 1314 (e.g., container perception), a behavior 1316 (e.g., container-item match), and a behavior 1318 (e.g., move to pre-grasp). The grasp phase 1320 includes a behavior 1322 (e.g., grasp) and a behavior 1324 (e.g., separate retaining elements). The pre-place phase 1330 includes a behavior 1332 (e.g., move to pre-place). The place phase 1340 includes a behavior 1342 (e.g., place) and a behavior 1344 (e.g., grasp perception).

Figure 14:
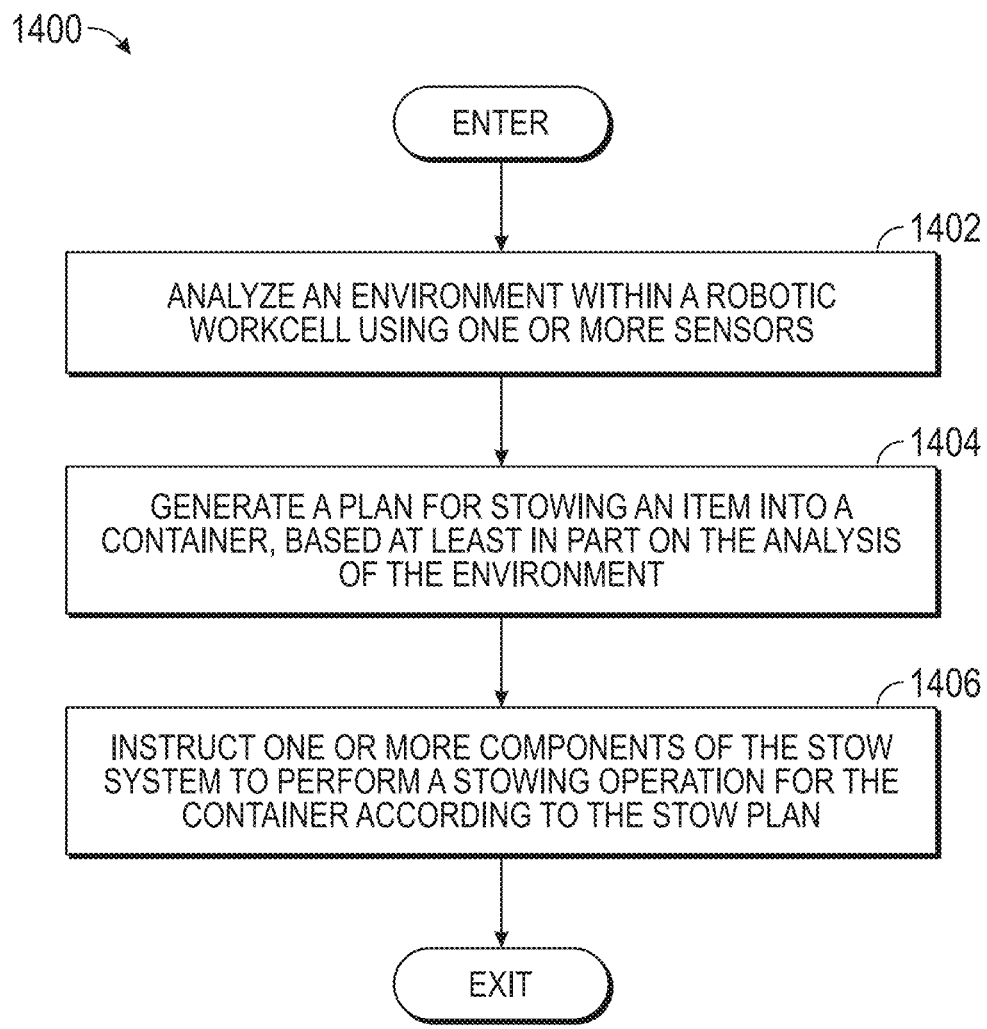
FIG. 14 is a flowchart of a method for performing a robotic stowing operation, according to one embodiment.

FIG. 14 is a flowchart of a method 1400 for performing a robotic stowing operation, according to one embodiment. The method 1400 may be performed by one or more components of a robotic workcell (e.g., robotic workcell 150). In one embodiment, the method 1400 is performed by one or more components (e.g., controller 240) of a stow system (e.g., stow system 180).

Method 1400 may enter at block 1402, where the stow system analyzes an environment in the robotic workcell using one or more sensors (e.g., sensor(s) 204). The robotic workcell may include at least one inventory holder (e.g., inventory holder 160) having multiple containers (e.g., containers 202) and a holding area (e.g., holding area 190) storing at least one item available for being stowed into the containers. The stow system may rely on a plurality of sensors that may be the same type (e.g., multiple cameras) or different types (e.g., a camera and a depth sensor).

The sensor(s) may be attached (or located) in various different locations within the robotic workcell. For example, a first set of sensor(s) may be attached on the external frame (e.g., frame 280) of the stow system, a second set of sensor(s) may be attached to one or more of the robotic gantries (e.g., robotic gantry 206/208), a third set of sensor(s) may be attached to the robotic end effector (e.g., robotic end effector 214), and/or a fourth set of sensor(s) may be attached to the various tools/end effectors (e.g., access tool 212, grabber tool 230, spacer tool 232, plunging tool 234, etc.).

In one embodiment, the sensor data captured by the sensor(s) is analyzed by a computer processor (e.g., controller 240) and a software application (e.g., stowing component 242, etc.). The software application may perform image processing and/or employ machine learning techniques to identify areas or items of interest in a captured image and/or depth map. The stow system can use this information to provide instructions and movement commands to components of the stow system (e.g., gantries 206/208, robotic end effector 214, access tool 212, grabber tool 230, spacer tool 232, plunging tool 234, etc.) described herein to perform a stow operation.

At block 1404, the stow system generates a plan for stowing the at least one item into a container, based at least in part on the analysis of the environment. For example, as described herein, the stow system can determine which of the containers is most suitable for stowing the at least one item, based in part on the item attributes of the item to be stowed, the item attributes of the already stowed items within the containers, arrangement of the already stowed items within the containers, amount of available space/occupied space within the containers, etc. At block 1406, the stow system instructs one or more components of the stow system to perform a stowing operation for the container according to the stow plan. The method 1400 may then exit.

Figure 15:
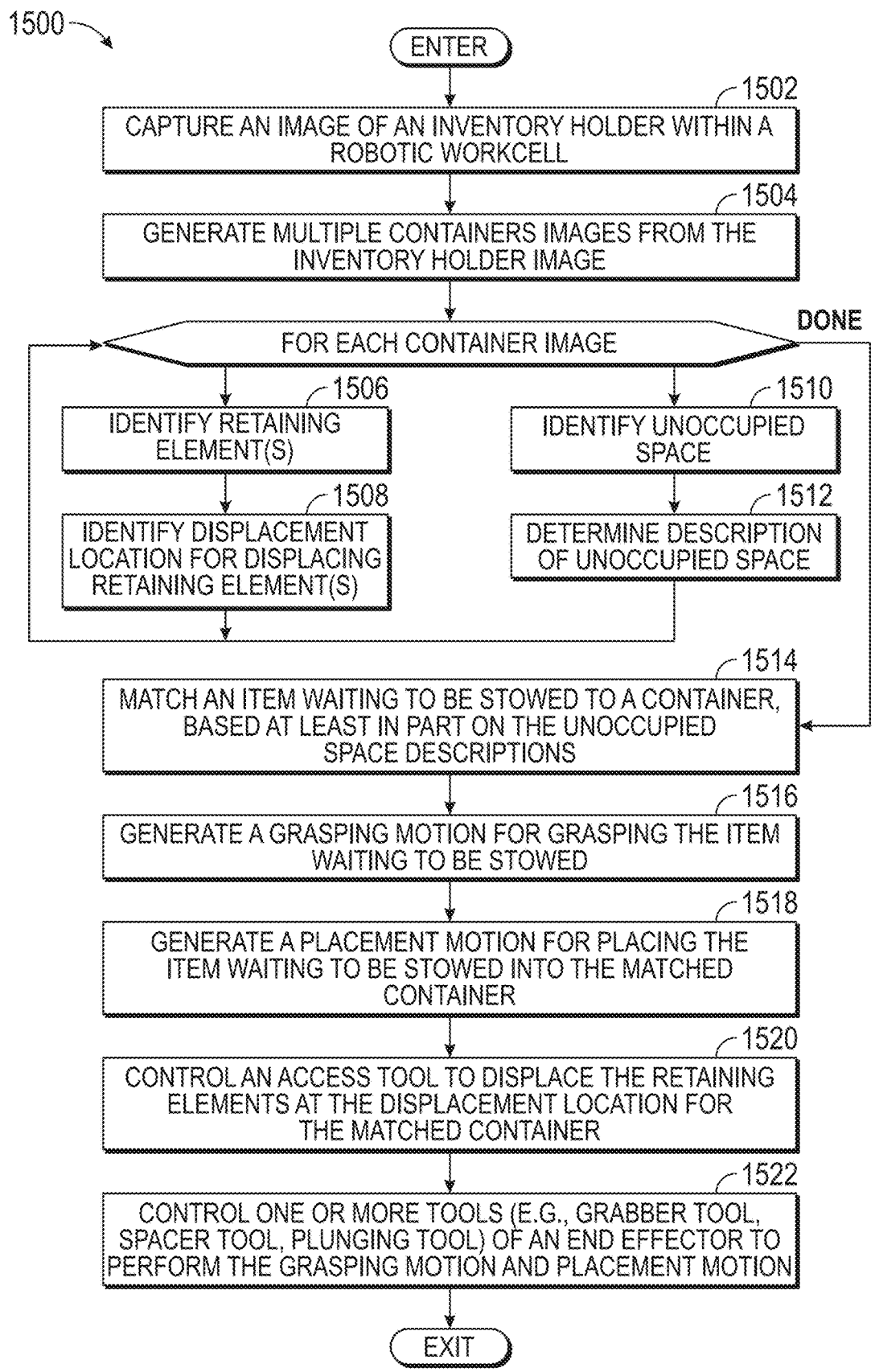
FIG. 15 is a flowchart of a method for performing a perception analysis for a stow operation, according to one embodiment.

FIG. 15 is a flowchart of a method 1500 for performing a perception analysis for a robotic stowing operation, according to one embodiment. The method 1500 may be performed by one or more components of a robotic workcell (e.g., robotic workcell 150). In one embodiment, the method 1500 is performed by one or more components (e.g., controller 240) of a stow system (e.g., stow system 180).

Method 1500 may enter at block 1502, where the stow system captures an image of an inventory holder (e.g., inventory holder image 302) within the robotic workcell (e.g., using one or more sensors 204). In some embodiments, the stow system may be configured to ensure that the tools and/or end effectors of the stow system are not in the field of view of the sensors 204 when the image of the inventory holder is captured.

At block 1504, the stow system generates multiple container images (e.g., container images 304) from the inventory holder image. In one embodiment, the operations in block 1504 may be performed by an inventory holder perception component 244, described in more detail above with respect to FIGS. 3 and 4.

For each container image, the stow system may perform the operations in blocks 1506, 1508, 1510, and 1512. At block 1506, the stow system identifies one or more retaining elements (e.g., retaining elements 210) securing contents within the container. At block 1508, the stow system identifies a (optimum) displacement location (e.g., displacement location 306) for displacing the one or more retaining elements securing contents within the container. At block 1510, the stow system identifies unoccupied (or free) space within the container. At block 1512, the stow system determines a description of the unoccupied space.

In one embodiment, the operations in blocks 1506 and 1508 may be performed in parallel with the operations in blocks 1510 and 1512 to minimize the task time of stowing an item into a container. For example, the operations in blocks 1506 and 1508 may be performed by a retaining element perception component 246, described in more detail above with respect to FIGS. 3 and 6. Similarly, the operations in blocks 1510 and 1512 may be performed by a space perception component 248, described in more detail above with respect to FIGS. 3 and 8.

At block 1514, the stow system matches an item waiting to be stowed (e.g., item 220) to a container, based at least in part on the description of unoccupied space within each container. In one embodiment, the operations in block 1514 may include generating a ranked list of container-to-item matches, where each container-to-item match in the ranked list is associated with a confidence score. In this embodiment, the stow system may select, from the ranked list of container-to-item matches, a container-to-item match having a confidence score that satisfies a predetermined condition. The predetermined condition may be based on at least one of a task time, a volume utilization, or a number of previous stow successes. The selected container-to-item match may indicate (i) the container for stowing the item waiting to be stowed and (ii) the item waiting to be stowed. In one embodiment, the operations in block 1514 may be performed by a match component 250, described in more detail above with respect to FIGS. 3 and 10.

At block 1516, the stow system generates a grasping motion (e.g., grasping motion 324) for grasping the item waiting to be stowed. At block 1518, the stow system generates a placement motion for placing the item waiting to be stowed into the matched container. At block 1520, the stow system controls an access tool (e.g., access tool 212) to displace the retaining elements at the displacement location for the matched container. At block 1522, the stow system controls one or more tools of an end effector (e.g., robotic end effector 214) to perform the grasping motion and placement motion. In one embodiment, the operations in blocks 1516, 1518, 1520, and 1522 may be performed by a motion planning component 252, described in more detail above with respect to FIGS. 3 and 12. The method 1500 may then exit.

In some embodiments, the stow system may use "before" and "after" images of a container to detect the result (e.g., success or failure) of a stow attempt. In these embodiments, the homography generated from the first (initial) inventory holder perception run may be reused to update solely the currently active container. In this manner, embodiments can perform container perception iteratively over time even when the access tool 212 is in the field of view of the sensors 204.

Figure 16:
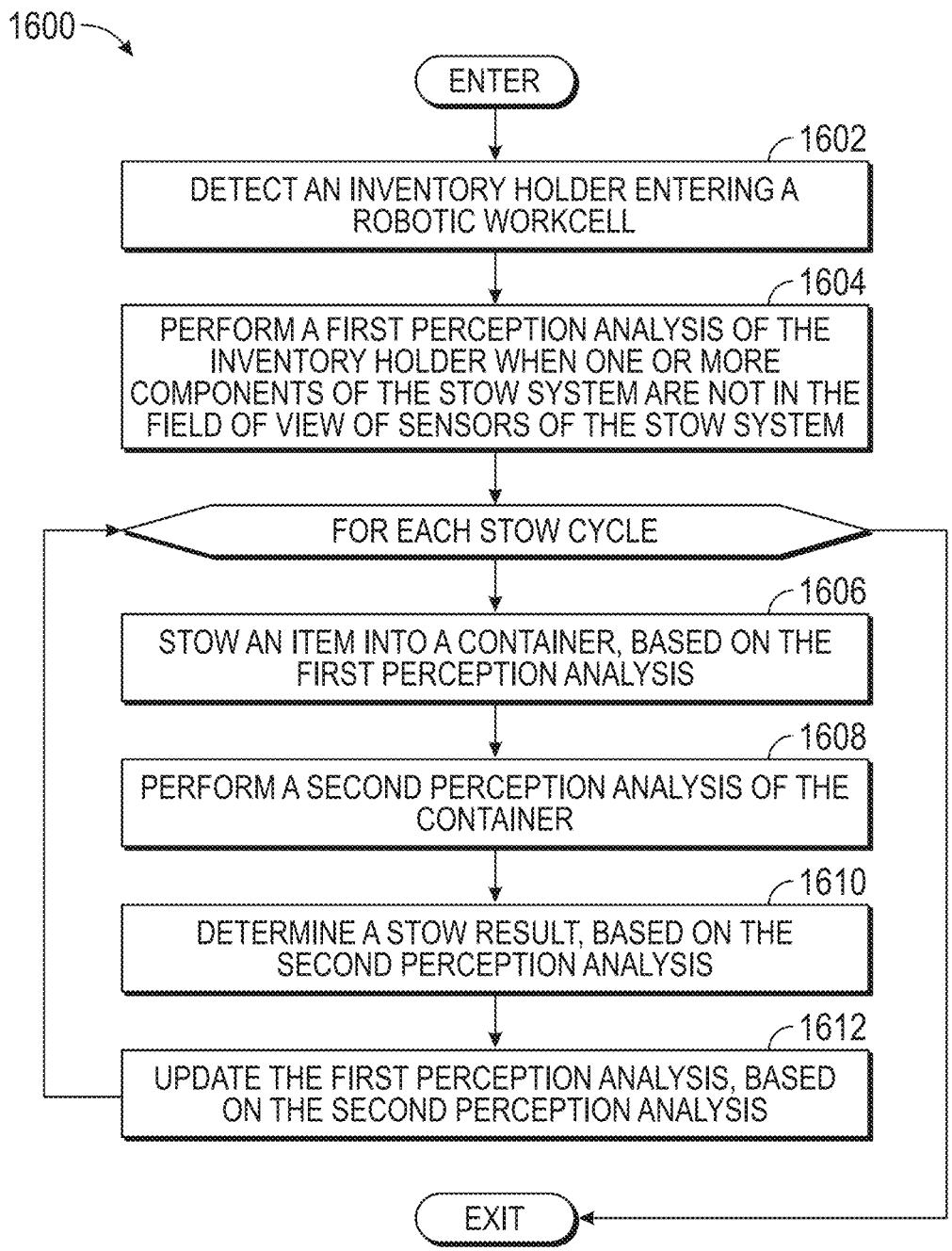
FIG. 16 is a flowchart of a method for updating a perception analysis for a stow operation, according to one embodiment.

FIG. 16 is a flowchart of a method 1600 for updating a perception analysis for a robotic stowing operation, according to one embodiment. The method 1600 may be performed by one or more components of a robotic workcell (e.g., robotic workcell 150). In one embodiment, the method 1600 is performed by one or more components (e.g., controller 240) of a stow system (e.g., stow system 180).

Method 1600 may enter at block 1602, where the stow system detects an inventory holder entering a robotic workcell. At block 1604, the stow system performs a first perception analysis of the inventory holder when one or more components of the stow system are not in the field of view of the sensors (e.g., sensors 204) of the stow system.

The stow system may perform blocks 1606, 1608, 1610, and 1612 for each stow cycle. At block 1606, the stow system stows an item into a container, based on the first perception analysis. At block 1608, the stow system performs a second perception analysis of the container. At block 1610, the stow system determines a stow result, based on the second perception analysis. At block 1612, the stow system updates the first perception analysis, based on the second perception analysis. The method 1600 may then exit.

Figures 17A, 17B:
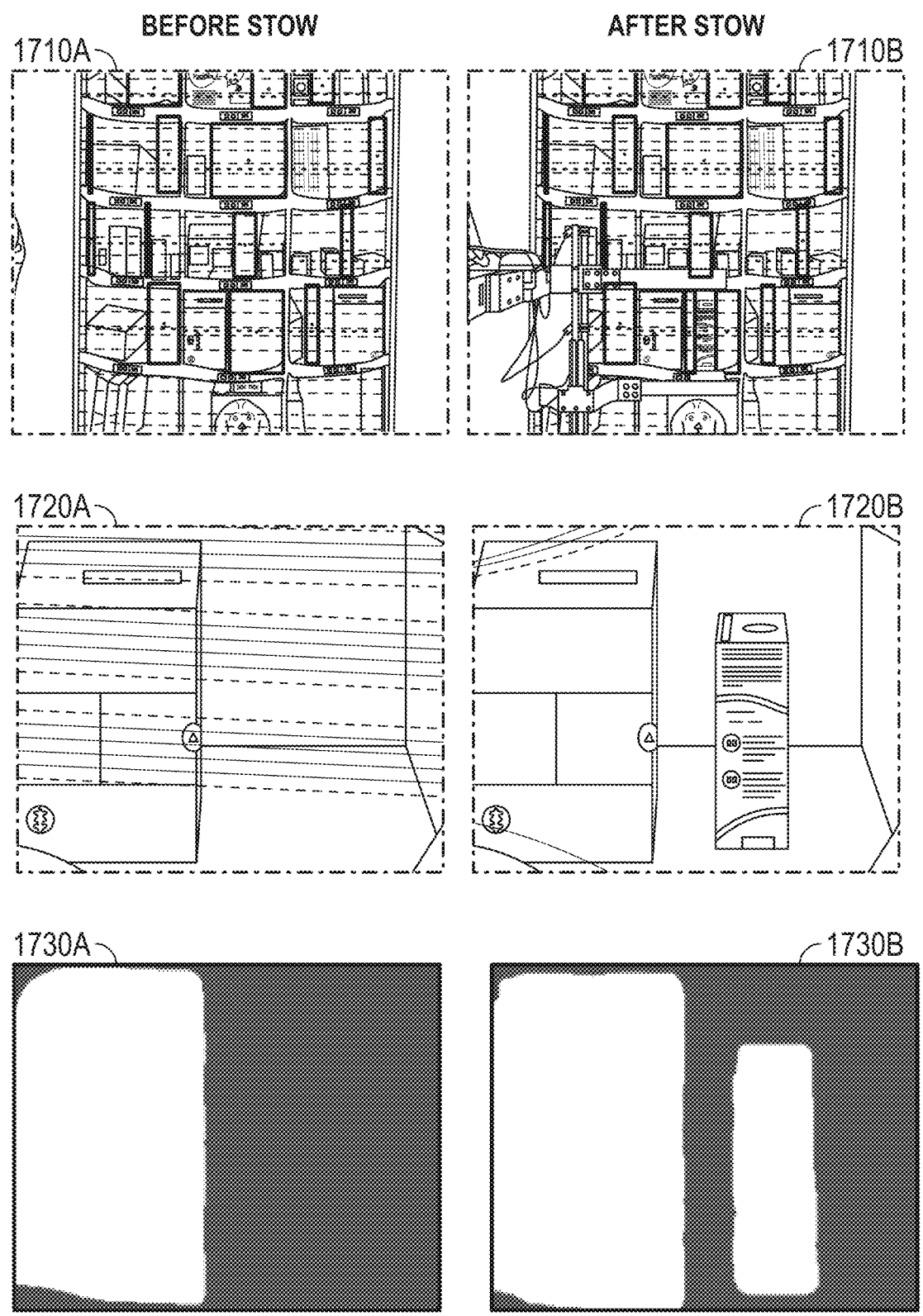
FIG. 17A illustrates an example of a perception analysis prior to a stow operation, according to one embodiment.
FIG. 17B illustrates an example of a perception analysis after a stow operation, according to one embodiment.

FIG. 17A illustrates a reference example of a perception analysis "prior" to a stow operation and FIG. 17B illustrates a reference example of a perception analysis "after" a stow operation, according to one embodiment. As shown in FIG. 17A, "prior" to the stow operation, the stow system may capture (or generate) images 1710A, 1720A, and 1730A. As shown in FIG. 17B, "after" the stow operation, the stow system may capture (or generate) images 1710B, 1720B, and 1730B. In images 1710B, 1720B, and 1730B, the stow system keeps the homography from images 1710A, 1720A, and 1730A, and uses the segmentation on the updated image 1720B.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An inventory system comprising:
a plurality of sensors disposed within a robotic workcell;
an inventory holder comprising a plurality of containers, wherein each of the plurality of containers comprises a plurality of retaining elements extending across an opening of the container;
a robotic apparatus comprising a plurality of end effector tools; and
a controller configured to perform an operation for stowing an item into one of the plurality of containers using the robotic apparatus, the operation comprising:
capturing, via the plurality of sensors, a first image of the inventory holder;
generating, from the first image, a plurality of second images, wherein each second image is an image of a different container of the plurality of containers;
determining a plurality of displacement locations for the plurality of containers, based on the plurality of second images, wherein each displacement location corresponds to a location within the respective container for placing a first end effector tool of the plurality of end effector tools to displace the plurality of retaining elements extending across the opening of the container;
determining a plurality of content signatures for the plurality of containers, based on the plurality of second images, wherein each content signature includes an indication of one or more regions within the container available for stowing an item into the container;
generating a match result comprising at least (i) an indication of a first container of the plurality of containers in which to stow a first item, (ii) a grasping strategy for grasping the first item, and (iii) a placement strategy for placing the first item into the one or more regions of the first container using a second end effector tool of the plurality of end effector tools;
controlling the first end effector tool to displace the plurality of retaining elements extending across the opening of the first container at the displacement location corresponding to the first container;
controlling the second end effector tool to grasp the first item using the grasping strategy; and
controlling the second end effector tool to place the first item that is grasped into the one of the one or more regions of the first container using the placement strategy.

2. The inventory system of claim 1, wherein generating the plurality of second images comprises:
   generating a third image based on performing semantic segmentation on the first image, wherein the third image comprises an indication of the plurality of containers segmented from the inventory holder; and
   performing one or more image processing operations on the third image to generate the plurality of second images.

3. The inventory system of claim 2, wherein the one or more image processing operations comprise at least one of (i) a homography operation or (ii) an extraction operation.

4. A computer-implemented method for performing a perception analysis for a robotic stowing operation, the computer-implemented method comprising:
   obtaining, via a plurality of sensors, a plurality of first images, wherein each first image is an image of a different container of an inventory holder within a robotic workcell;
   performing a first machine learning and image processing pipeline with the plurality of first images to determine a plurality of displacement locations for a plurality of containers of the inventory holder;
   performing a second machine learning and image processing pipeline with the plurality of first images to determine a plurality of content signatures for the plurality of containers;
   generating a plan for stowing a first item into a first container of the plurality of containers, based at least in part on the plurality of content signatures and the plurality of displacement locations; and
   controlling a robotic apparatus to stow the first item into the first container, based on the plan.

5. The computer-implemented method of claim 4, wherein the first machine learning and image processing pipeline and the second machine learning and image processing pipeline are performed in parallel.

6. The computer-implemented method of claim 4, wherein each of the plurality of first images comprises an indication of one or more retaining elements disposed at an opening of the respective container.

7. The computer-implemented method of claim 6, wherein performing the first machine learning and image processing pipeline comprises, for each first image:
   performing a semantic segmentation operation on the first image to generate a mask indicating regions within the first image belonging to the one or more retaining elements; and
   performing one or more image processing operations on the mask to identify one or more clusters of pixels within the regions belonging to the one or more retaining elements.

8. The computer-implemented method of claim 7, wherein performing the first machine learning and image processing pipeline further comprises, for each first image, selecting a location within the mask that satisfies a predetermined condition as a displacement location for the respective container.

9. The computer-implemented method of claim 4, wherein controlling the robotic apparatus comprises controlling movement of an end effector tool of the robotic apparatus to displace one or more retaining elements disposed at an opening of the first container at a displacement location corresponding to the first container.

10. The computer-implemented method of claim 4, wherein performing the second machine learning and image processing pipeline comprises, for each first image:
   performing a semantic segmentation operation on the first image to generate a mask indicating regions within the first image belonging to unoccupied space; and
   performing one or more image processing operations on the mask to determine one or more regions within the respective container available for stowing an item, wherein a content signature for the respective container includes the one or more regions.

11. The computer-implemented method of claim 10, wherein the one or more regions are indicated as vertical slot regions within the first image.

12. The computer-implemented method of claim 10, wherein each of the one or more regions is associated with a placement strategy for placing an item into the region using an end effector tool of the robotic apparatus.

13. The computer-implemented method of claim 12, wherein the placement strategy comprises a bin sweep motion or a slot wedge motion.

14. The computer-implemented method of claim 4, wherein performing the second machine learning and image processing pipeline comprises, for each first image performing an instance segmentation operation on the first image to generate a mask indicating one or more regions within the first image belonging to one or more different instances of items, wherein a content signature for the respective container includes the one or more regions.

15. The computer-implemented method of claim 4, wherein generating the plan comprises generating a ranked list of container-to-item matches, wherein each container-to-item match in the ranked list is associated with a confidence score.

16. The computer-implemented method of claim 15, wherein generating the plan further comprises selecting, from the ranked list of container-to-item matches, a container-to-item match having a confidence score that satisfies a predetermined condition, wherein the selected container-to-item match indicates (i) the first container of the plurality of containers for stowing the first item and (ii) the first item out of a plurality of items for stowing into the first container.

17. The computer-implemented method of claim 16, wherein generating the plan further comprises:
   determining a grasping strategy for grasping the first item using an end effector tool of the robotic apparatus; and
   determining a placement strategy for placing the first item that is grasped using the grasping strategy into the first container using the end effector tool of the robotic apparatus.

18. The computer-implemented method of claim 16, further comprising evaluating the plurality of content signatures and attributes of a plurality of items waiting to be stowed with a machine learning model to determine a plurality of confidence scores, wherein each confidence score is associated with a value of at least one predefined metric, wherein the container-to-item match that is selected is associated with a value of the at least one predefined metric that satisfies the predetermined condition.

19. The computer-implemented method of claim 18, wherein the at least one predefined metric comprises at least one of a task time, a volume utilization, or a number of previous stow successes.

20. A non-transitory computer readable storage medium having computer-executable code stored thereon, the computer-executable code being executable by one or more computer processors to perform an operation for perception analysis for a robotic stowing operation, the operation comprising:

obtaining, via a plurality of sensors, a plurality of first images, wherein each first image is an image of a different container of an inventory holder within a robotic workcell;

performing a first machine learning and image processing pipeline with the plurality of first images to determine a plurality of displacement locations for a plurality of containers of the inventory holder;

performing a second machine learning and image processing pipeline with the plurality of first images to determine a plurality of content signatures for the plurality of containers;

generating a plan for stowing a first item into a first container of the plurality of containers, based at least in part on the plurality of content signatures and the plurality of displacement locations; and controlling a robotic apparatus to stow the first item into the first container, based on the plan.

* * * * *